(12) United States Patent
Chou et al.

(10) Patent No.: US 11,106,019 B2
(45) Date of Patent: Aug. 31, 2021

(54) PLASTIC BARREL, AUTOFOCUS MODULE AND ELECTRONIC DEVICE

(71) Applicant: LARGAN DIGITAL CO., LTD., Taichung (TW)

(72) Inventors: Ming-Ta Chou, Taichung (TW); Chun-Hua Tsai, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 57 days.

(21) Appl. No.: 16/426,073

(22) Filed: May 30, 2019

(65) Prior Publication Data
US 2020/0018925 A1 Jan. 16, 2020

(30) Foreign Application Priority Data

Jul. 12, 2018 (TW) .................................. 107124141

(51) Int. Cl.
*G02B 15/14* (2006.01)
*G02B 7/10* (2021.01)
*B29C 45/00* (2006.01)

(52) U.S. Cl.
CPC .......... *G02B 15/14* (2013.01); *B29C 45/0025* (2013.01); *G02B 7/102* (2013.01); *B29C 2045/0027* (2013.01)

(58) Field of Classification Search
CPC ... G02B 7/08; G02B 7/04; G02B 7/09; G02B 7/102; G02B 7/103; G02B 7/02; G02B 13/001; G02B 13/10; G02B 13/009; G02B 13/34; G02B 13/36; G02B 3/0075; B29C 31/006; B29C 31/008; B29C 2033/705; B29C 2043/5891; B29C 2945/76464; B29C 2946/78512; G03B 5/00; G03B 17/02;
(Continued)

(56) References Cited

U.S. PATENT DOCUMENTS 7,806,607 B2 10/2010 Iyoda et al.
10,027,865 B1 * 7/2018 Tsai ....................... G02B 7/021
(Continued)

FOREIGN PATENT DOCUMENTS

JP H08194146 A 7/1996
JP 5049605 B2 10/2012
(Continued)

*Primary Examiner* — William R Alexander
*Assistant Examiner* — Tamara Y. Washington
(74) *Attorney, Agent, or Firm* — McClure, Qualey & Rodack, LLP

(57) ABSTRACT

A plastic barrel includes an inner portion and an outer portion. The inner portion defines an interior space. The inner portion includes, in order from an object side to an image side, an object-side opening, a plurality of inner annular surfaces and an image-side opening. The interior space is configured for accommodating an imaging lens assembly, and the imaging lens assembly includes a plurality of plastic lens elements. The outer portion surrounds the inner portion. The outer portion includes a mounting structure. The mounting structure is disposed on a surface of the outer portion. The mounting structure is injection molded for mounting a planar conductive element and a wiring element. The mounting structure includes at least three gate traces, and the three gate traces are located on a surface of the mounting structure.

20 Claims, 25 Drawing Sheets

(58) Field of Classification Search
CPC ... H04N 5/2251; H04N 5/2254; H04N 5/2257
See application file for complete search history.

(56) References Cited

U.S. PATENT DOCUMENTS

| | | | | |
|---|---|---|---|---|
| 2006/0125925 A1* | 6/2006 | Lee | ...................... | H04N 5/2254 |
| | | | | 348/208.12 |
| 2014/0133040 A1* | 5/2014 | Tsai | ........................ | G02B 7/02 |
| | | | | 359/819 |
| 2016/0329801 A1* | 11/2016 | Hu | ........................ | H02K 99/20 |
| 2017/0010434 A1* | 1/2017 | Chou | ..................... | G02B 7/021 |
| 2017/0023764 A1 | 1/2017 | Chou | | |
| 2017/0075109 A1* | 3/2017 | Chou | ..................... | G02B 5/208 |
| 2017/0131513 A1* | 5/2017 | Lin | ........................ | G02B 7/021 |
| 2018/0129011 A1* | 5/2018 | Tsai | ........................ | G02B 7/021 |
| 2018/0295266 A1* | 10/2018 | Tsai | ..................... | H04N 5/2254 |
| 2019/0179107 A1* | 6/2019 | Hsu | ........................ | G02B 7/04 |
| 2019/0196132 A1* | 6/2019 | Tang | ..................... | G02B 7/025 |
| 2020/0018925 A1* | 1/2020 | Chou | ..................... | G02B 7/102 |
| 2020/0089083 A1* | 3/2020 | Tseng | ..................... | G03B 13/36 |
| 2020/0154013 A1* | 5/2020 | Tsai | ........................ | G02B 7/021 |
| 2020/0209711 A1* | 7/2020 | Tseng | ................... | H04N 5/2257 |

FOREIGN PATENT DOCUMENTS

| | | |
|---|---|---|
| TW | I479218 B | 4/2015 |
| TW | M509915 U | 10/2015 |
| TW | I625563 B | 6/2018 |

* cited by examiner

PLASTIC BARREL, AUTOFOCUS MODULE AND ELECTRONIC DEVICE

RELATED APPLICATIONS

This application claims priority to Taiwan Application Serial Number 107124141, filed Jul. 12, 2018, which is herein incorporated by reference.

BACKGROUND

Technical Field

The present disclosure relates to a plastic barrel and an autofocus module. More particularly, the present disclosure relates to a plastic barrel and an autofocus module applicable to an electronic device.

Description of Related Art

With the popularity of personal electronic products and mobile communication products having camera functionalities, such as smart phones and tablet personal computers, the demand for compact electronic devices with high resolution and high image quality also increases significantly.

Nowadays, a lens assembly employed in an electronic device normally adopts a voice coil motor (VCM) as a driving apparatus for providing autofocus function. With an electromagnetic force generated by the interaction of magnets and a coil, and with the degree of freedom and the restoring force provided by springs which are required by the movement of the carrier carrying the lens assembly, the carrier is driven by the voice coil motor to bring the lens assembly to move along a direction parallel to an optical axis, so that the autofocus functionality of the lens assembly can be achieved.

However, the plastic barrel in the conventional lens assembly is prone to the problem of too complicated plastic flow in the mold during manufacture, which would enhance the difficulty in injection molding, and is unfavorable for improving yield rate and production efficiency.

SUMMARY

According to one aspect of the present disclosure, a plastic barrel includes an inner portion and an outer portion. The inner portion defines an interior space. The inner portion includes, in order from an object side to an image side, an object-side opening, a plurality of inner annular surfaces and an image-side opening. The interior space is configured for accommodating an imaging lens assembly, and the imaging lens assembly includes a plurality of plastic lens elements. The outer portion surrounds the inner portion. The outer portion includes a mounting structure, the mounting structure is disposed on a surface of the outer portion, the mounting structure is injection molded for mounting a planar conductive element and a wiring element, the mounting structure includes at least three gate traces, and the three gate traces are located on a surface of the mounting structure. When a diameter of the object-side opening is φo, and a diameter of the image-side opening is φi, the following condition is satisfied: $0.05<\phi o/\phi i<0.80$.

According to another aspect of the present disclosure, an autofocus module includes the plastic barrel according to the aforementioned aspect and the imaging lens assembly disposed in the interior space of the plastic barrel.

According to another aspect of the present disclosure, an electronic device includes the autofocus module according to the aforementioned aspect and an image sensor disposed on an image surface of the imaging lens assembly.

According to another aspect of the present disclosure, a plastic barrel includes an inner portion and an outer portion. The inner portion defines an interior space, wherein the inner portion includes, in order from an object side to an image side, an object-side opening, a plurality of inner annular surfaces and an image-side opening, the interior space is configured for accommodating an imaging lens assembly, and the imaging lens assembly includes a plurality of plastic lens elements. The outer portion surrounds the inner portion, wherein the outer portion includes a mounting structure and at least three gate traces. The mounting structure is disposed on a surface of the outer portion, wherein the mounting structure is injection molded for mounting a planar conductive element and a wiring element. The mounting structure includes an annular groove structure, the annular groove structure is disposed on the surface of the outer portion, and the annular groove structure is injection molded for mounting the wiring element. The three gate traces are closer to the object-side opening than the annular groove structure. When a diameter of the object-side opening is φo, and a diameter of the image-side opening is φi, the following condition is satisfied: $0.05<\phi o/\phi i<0.80$.

BRIEF DESCRIPTION OF THE DRAWINGS

The present disclosure can be more fully understood by reading the following detailed description of the embodiment, with reference made to the accompanying drawings as follows.

DETAILED DESCRIPTION

1st Embodiment

Figure 1:
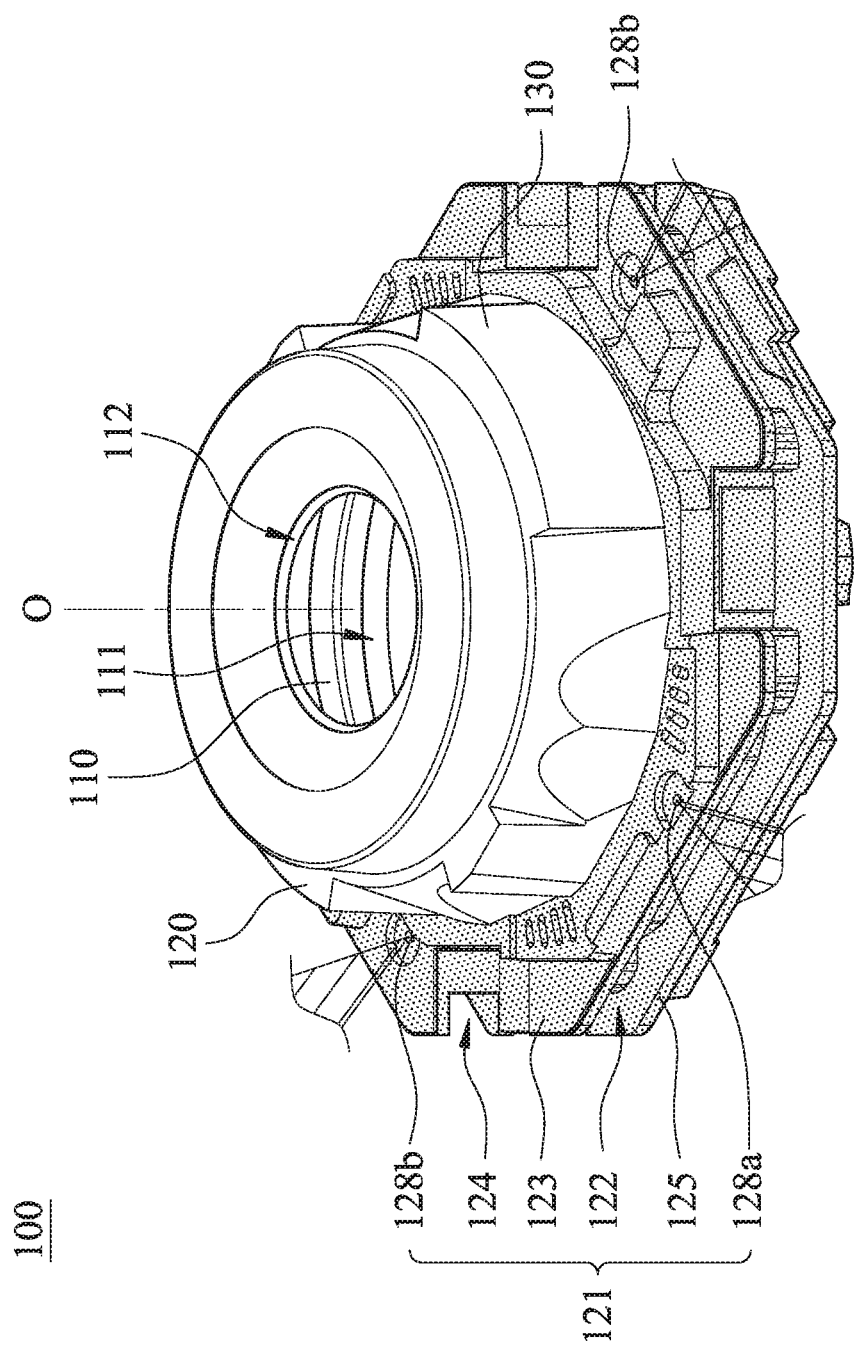
FIG. 1 is a three-dimensional view of a plastic barrel according to the 1st embodiment of the present disclosure.
Figure 2:
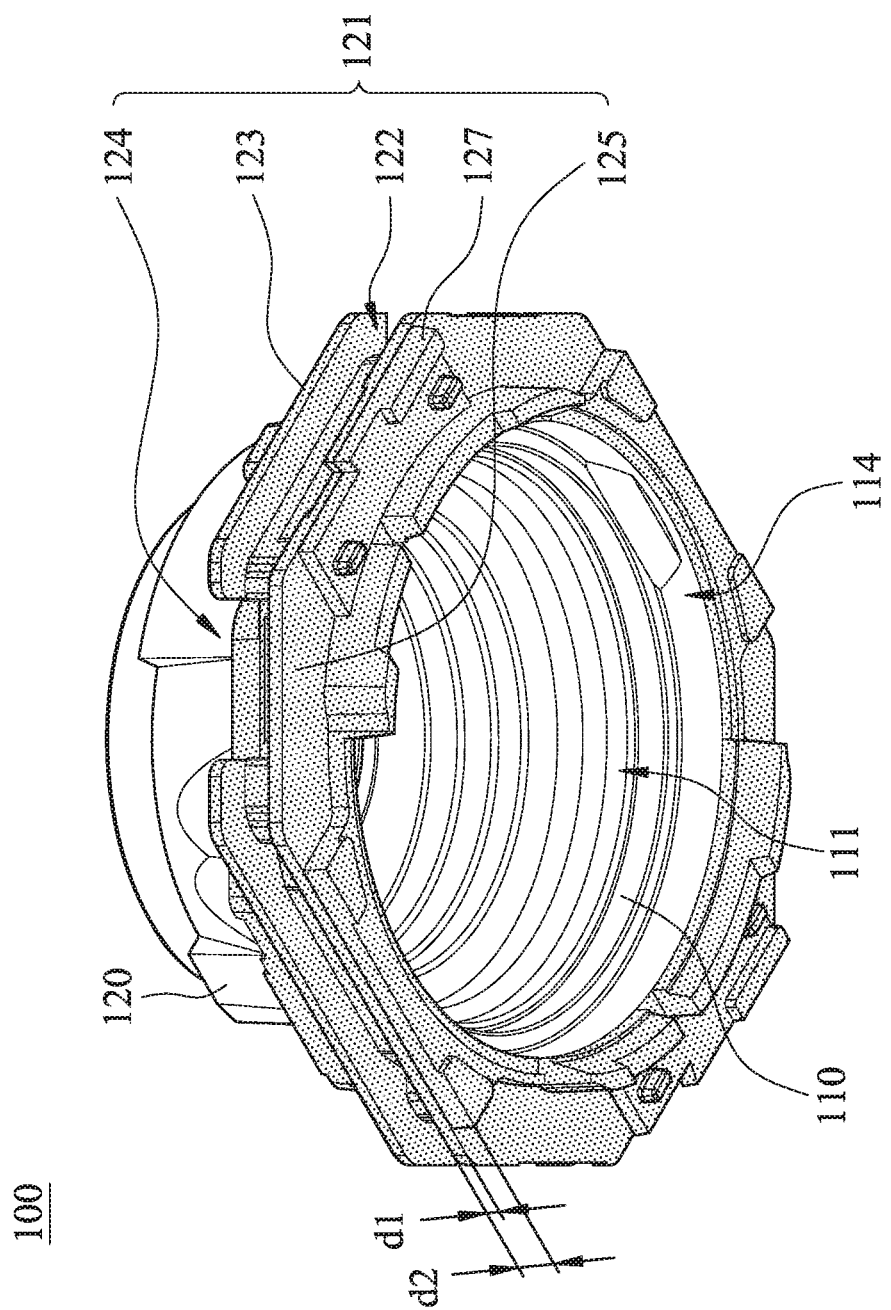
FIG. 2 is another three-dimensional view of the plastic barrel of FIG. 1.
Figure 3:
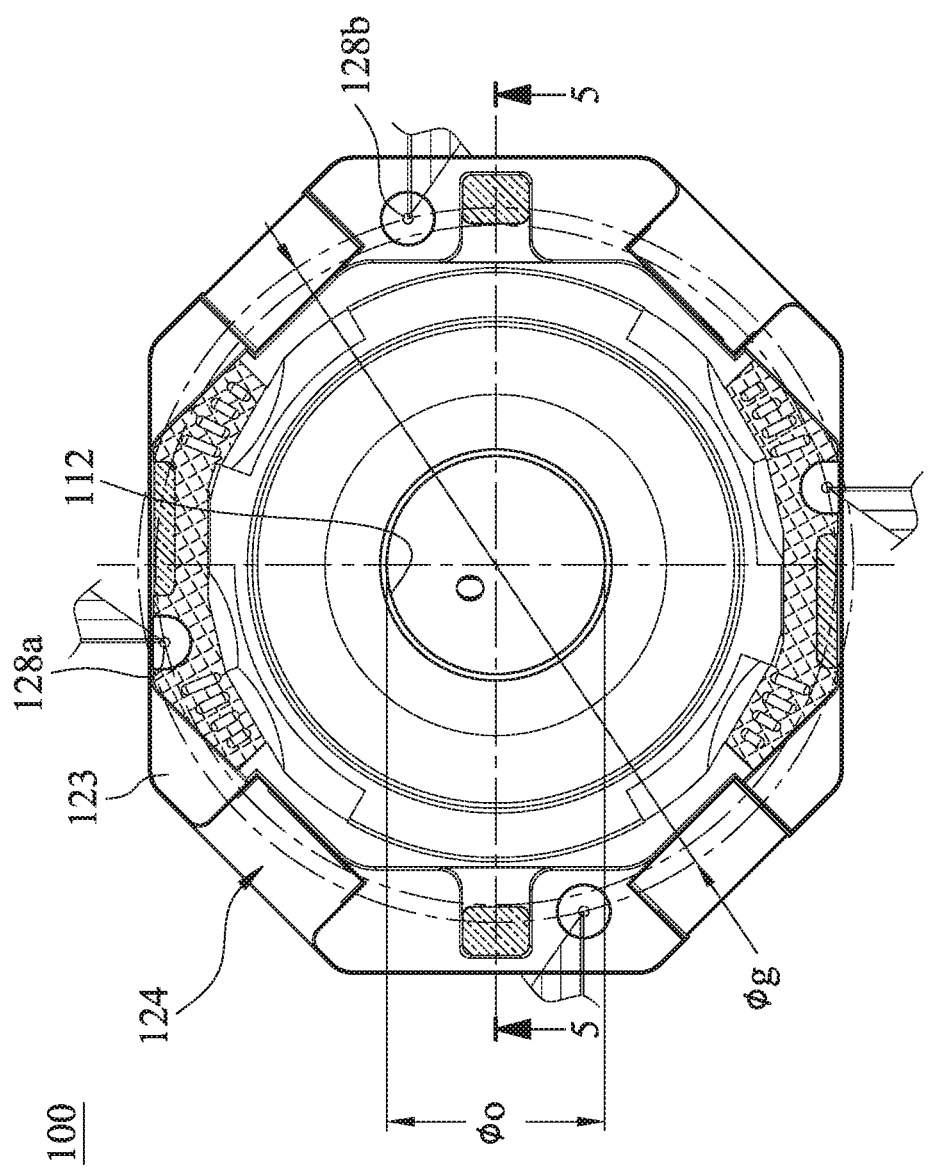
FIG. 3 is a top view of the plastic barrel of FIG. 1.
Figure 4:
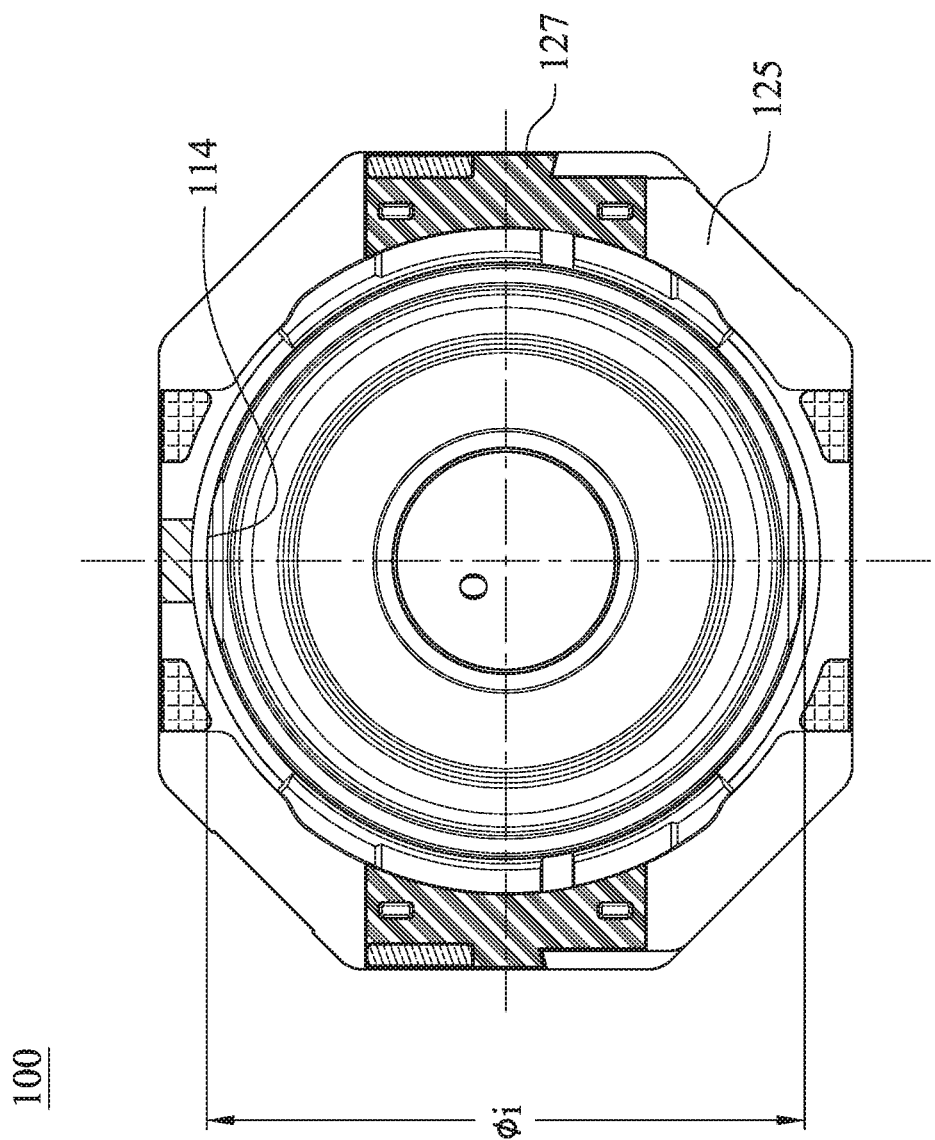
FIG. 4 is a bottom view of the plastic barrel of FIG. 1.
Figure 5:
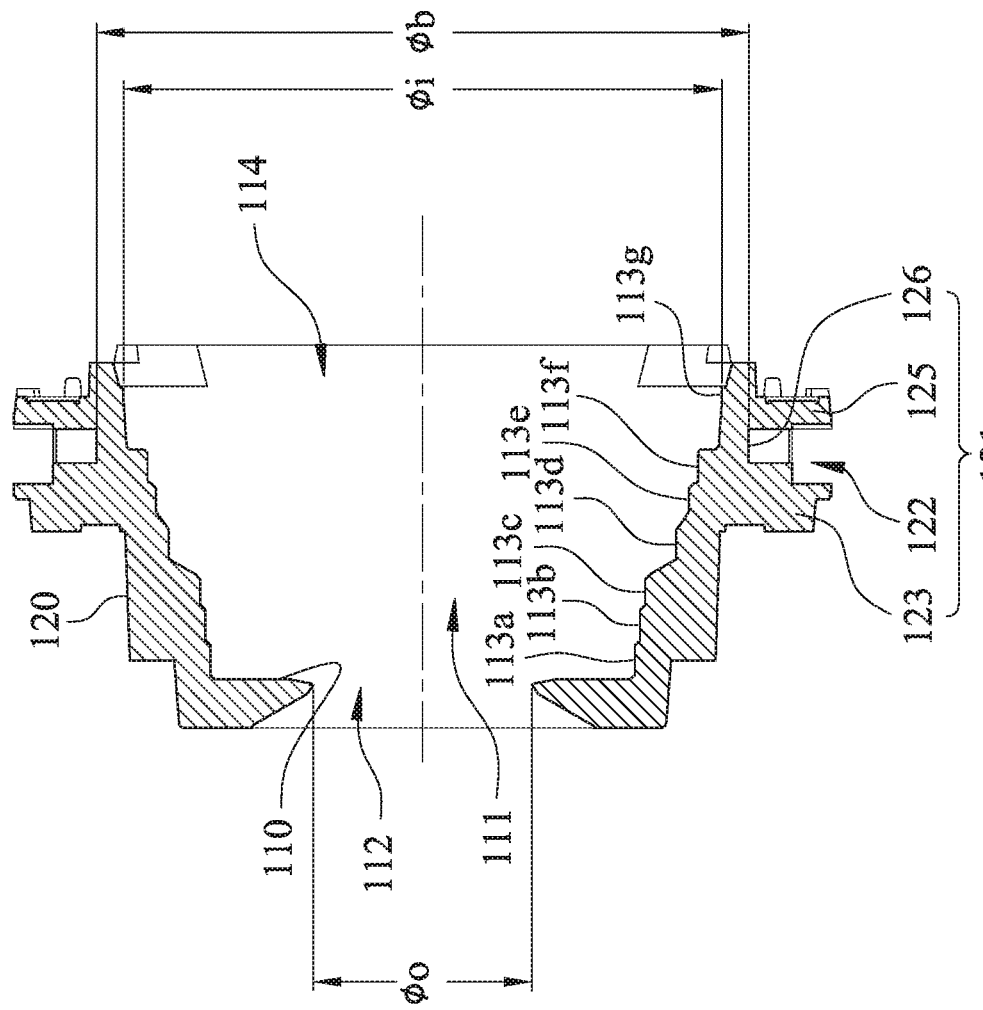
FIG. 5 is a cross-sectional view taken along line 5-5 of the plastic barrel of FIG. 3.
Figure 6:
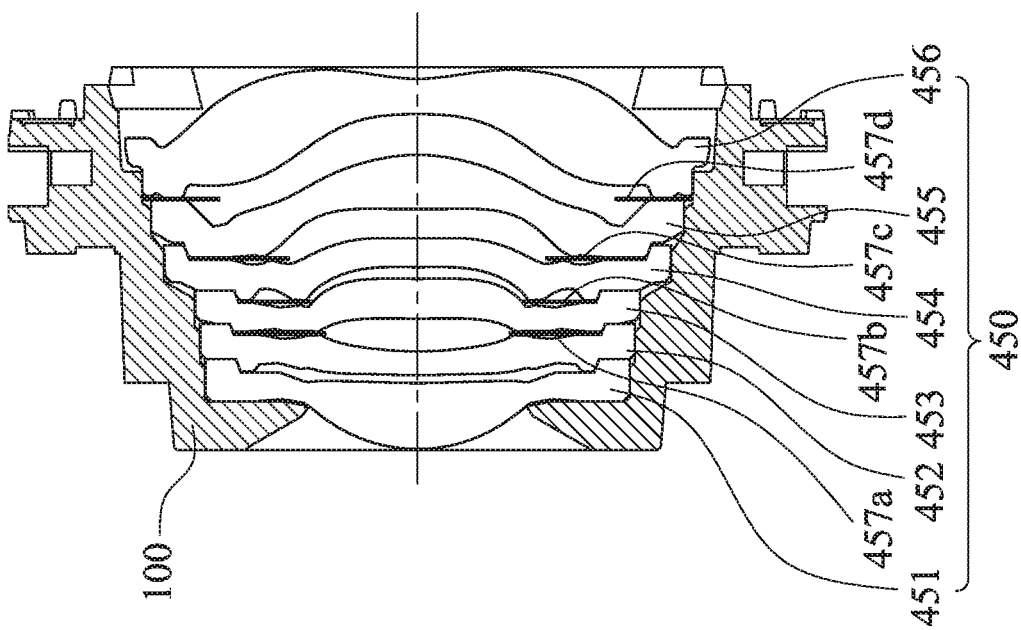
FIG. 6 is a cross-sectional view of the plastic barrel assembled to the imaging lens assembly of FIG. 5.

FIG. 1 is a three-dimensional view of a plastic barrel 100 according to the 1st embodiment of the present disclosure. FIG. 2 is another three-dimensional view of the plastic barrel 100 of FIG. 1. FIG. 3 is a top view of the plastic barrel 100 of FIG. 1. FIG. 4 is a bottom view of the plastic barrel 100 of FIG. 1. FIG. 5 is a cross-sectional view taken along line 5-5 of the plastic barrel 100 of FIG. 3. In FIG. 1 to FIG. 5, the plastic barrel 100 includes an inner portion 110 and an outer portion 120. The inner portion 110 defines an interior space 111, the inner portion 110 includes, in order from an object side to an image side, an object-side opening 112, a plurality of inner annular surfaces 113a, 113b, 113c, 113d, 113e, 113f and 113g (as shown in FIG. 5) and an image-side opening 114. The interior space 111 is configured for accommodating an imaging lens assembly (as shown in FIG. 6), and the imaging lens assembly includes a plurality of plastic lens elements.

Figure 7:
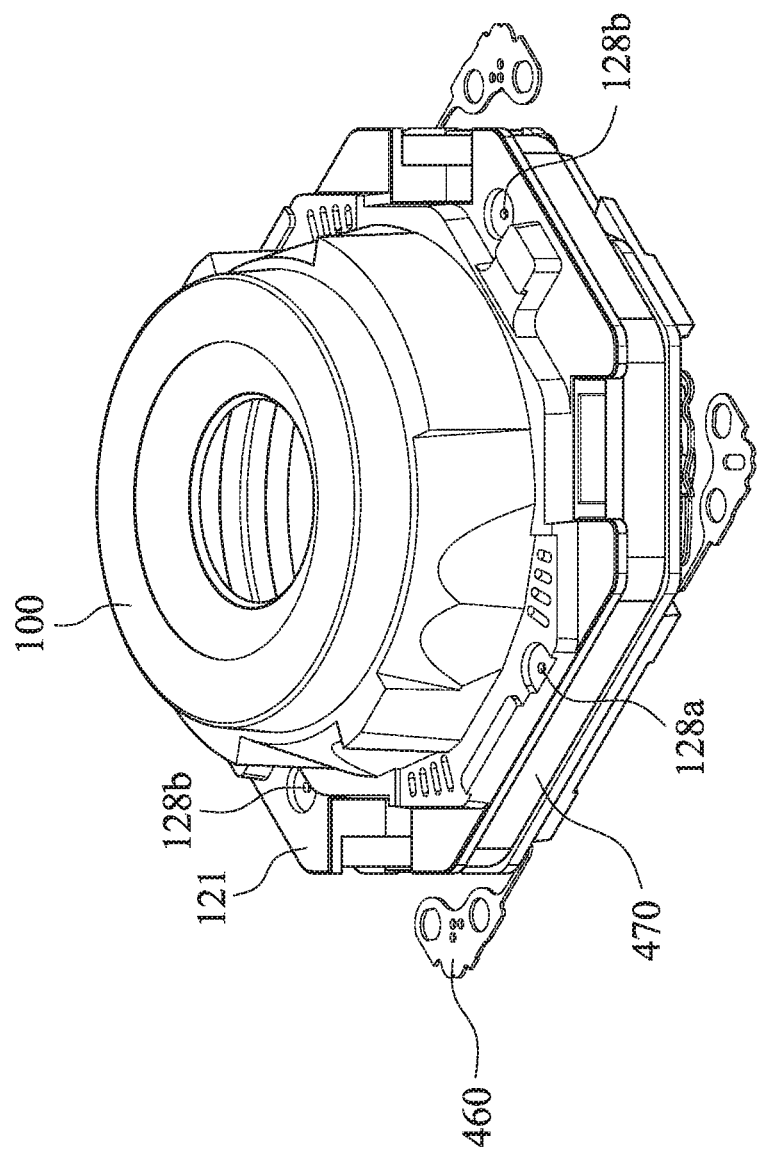
FIG. 7 is a three-dimensional view of the plastic barrel assembled to a planar conductive element and a wiring element of FIG. 1.
Figure 8:
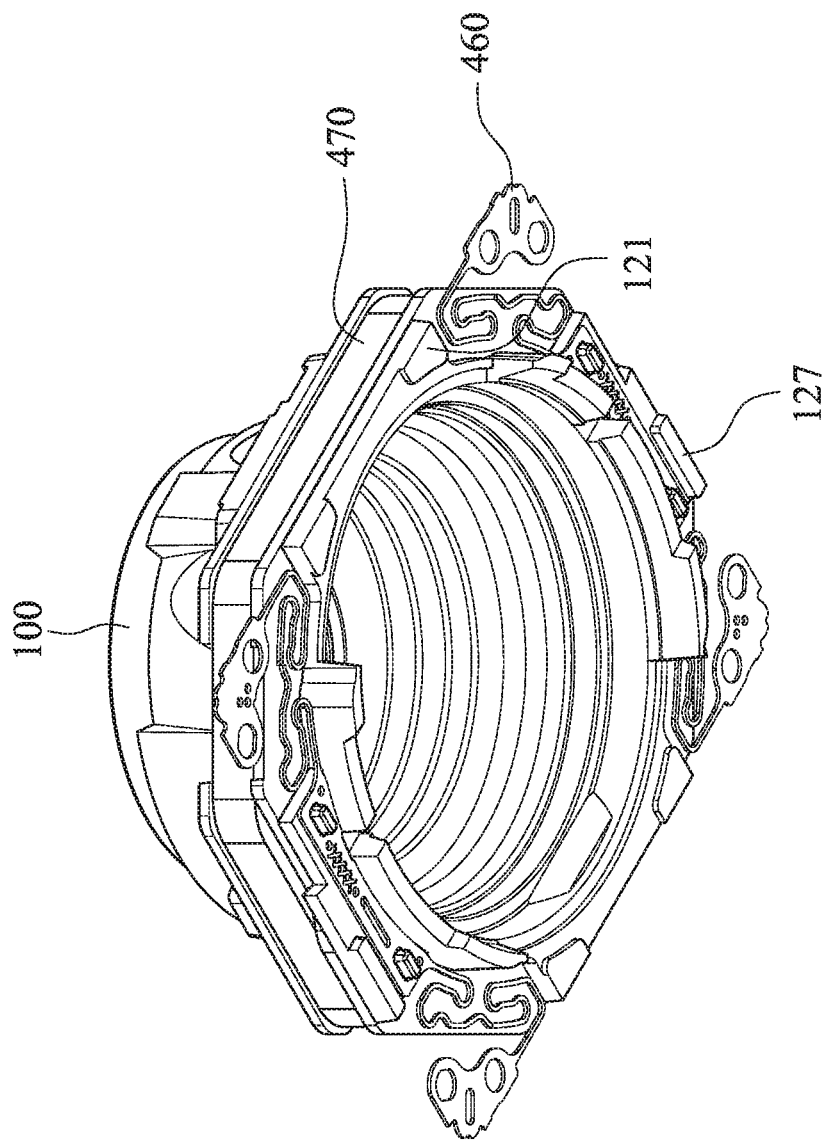
FIG. 8 is another three-dimensional view of the plastic barrel assembled to the planar conductive element and the wiring element of FIG. 7.

The outer portion 120 surrounds the inner portion 110. The outer portion 120 includes a mounting structure 121. According to the 1st embodiment, the mounting structure 121 is illustrated with dots in FIG. 1 and FIG. 2, which is for easily identifying the mounting structure 121 and the mounting structure 121 is illustrated without dot in FIG. 3 to FIG. 8. The mounting structure 121 is disposed on a surface 130 of the outer portion 120, and the mounting structure 121 is injection molded for mounting a planar conductive element and a wiring element (as shown in FIG. 7 and FIG. 8). The mounting structure 121 includes at least three gate traces 128a, 128b, wherein a number of the gate traces 128a is two, a number of the gate traces 128b is two, and the at least three gate traces 128a and 128b are located on a surface (its reference numeral is omitted) of the mounting structure 121. When a diameter of the object-side opening 112 is ϕo, and a diameter of the image-side opening 114 is ϕi, the following condition is satisfied: $0.05 < \phi o/\phi i < 0.80$.

With the aforementioned structure, it is favorable for simplifying the flow of the plastic material in a mold so as to reduce the difficulty of injection molding and increase the yield rate and the production efficiency.

Furthermore, according to the present disclosure, the gate traces are formed by removing part of the gate portion during injection molding, and the injection molding is well known in the art which will not be described herein.

In the 1st embodiment, the plastic barrel 100 can be manufactured by injection molding, and the plastic barrel 100 can be a black single piece plastic body which is integrally formed. Specifically, the inner portion 110 and the outer portion 120 are integrally formed on the plastic barrel 100, that is, the mounting structure 121 of the outer portion 120 is also integrally formed on the plastic barrel 100. According to the conventional autofocus module (not shown), which provides the lens assembly and the carrier being two independent components, and the metal conductor components, such as the planar conductive element and the wiring element, being disposed on the carrier. However, the plastic barrel of the present disclosure can accommodate the imaging lens assembly and the metal conductor components at the same time. Therefore, the additional process of assembling the conventional lens assembly with the carrier can be omitted, and can avoid the pollution caused by the aforementioned assembling, and it is favorable for improving the tolerance of the conventional assembling by the precision of the mold design so as to improve the assembling accuracy.

In the 1st embodiment, the aforementioned black single piece plastic body can be blended with a chemical fiber or a glass fiber. Therefore, it is favorable for increasing the fluidity of the plastic material so as to improve the molding quality, and when the glass fiber is blended, the structural strength of the plastic barrel 100 can be enhanced.

In the 1st embodiment, the plastic barrel 100 can be a threadless structure. Therefore, the complexity of the mold design can be reduced by omitting the thread structure.

FIG. 6 is a cross-sectional view of the plastic barrel 100 assembled to the imaging lens assembly 450 of FIG. 5. In FIG. 6, the imaging lens assembly 450 includes six plastic lens elements, which are, in order from the object side to the image side, a plastic lens element 451, a plastic lens element 452, a plastic lens element 453, a plastic lens element 454, a plastic lens element 455, and a plastic lens element 456, and the imaging lens assembly 450 further includes a spacer element 457a, a spacer element 457b, a spacer element 457c and a spacer element 457d, the spacer element 457a is disposed between the plastic lens element 452 and plastic lens element 453, the spacer element 457b is disposed between the plastic lens element 453 and plastic lens element 454, the spacer element 457c is disposed between the plastic lens element 454 and plastic lens element 455, the spacer element 457d is disposed between the plastic lens element 455 and plastic lens element 456. As shown in FIG. 5 and FIG. 6, the inner annular surfaces 113a-113g can be corresponding to the optical elements in the imaging lens assembly 450, that are, the plastic lens element 451-456 and the spacer elements 457a-457d. Therefore, it is favorable for directly accommodating the imaging lens assembly 450 in the interior space 111 of the plastic barrel 100. Furthermore, the imaging lens assembly 450 in the 1st embodiment is an illustration, and the present disclosure is not limited thereto. In other embodiments, the configuration of the optical elements in the imaging lens assembly 450, such as the number, the structure, and the arrangement of the optical elements, may be adjusted according to the desired optical characteristics, and the configuration of the inner annular surfaces of the plastic barrel can be adjusted according to the arrangement of the optical elements in the imaging lens assembly 450.

In FIG. 5, when the diameter of the object-side opening 112 is ϕo, and the diameter of the image-side opening 114 is ϕi, the following condition is satisfied: $0.10 < \phi o/\phi i < 0.60$. Therefore, the plastic material in the mold can flow from the peripheral region to the inner region along the radial direction, which is favorable for reducing the disorder of the plastic material flow.

The mounting structure 121 can further include an annular groove structure 122, the annular groove structure 122 is disposed on the surface 130 of the outer portion 120. FIG. 7 is a three-dimensional view of the plastic barrel 100 assembled to a planar conductive element 460 and a wiring element 470 of FIG. 1, FIG. 8 is another three-dimensional view of the plastic barrel 100 assembled to the planar conductive element 460 and the wiring element 470 of FIG. 7. As shown in FIG. 7 and FIG. 8, the annular groove structure 122 can be injection molded for mounting the wiring element 470, wherein the wiring element 470 can be wound with a wire having an insulating outer layer, such as an enameled wire. Therefore, it is favorable for regularly arranging the wiring element 470 on the outside of the plastic barrel 100, so as to improve the focusing efficiency of electromagnetic actuation. In the 1st embodiment, the wiring element 470 is disposed in an assembling method to the annular groove structure 122.

In FIG. 2 and FIG. 8, the mounting structure 121 further includes a fixing structure 127, the fixing structure 127 is adjacent to the annular groove structure 122, and the fixing structure 127 is injection molded for mounting the planar conductive element 460. Therefore, it is favorable for stably assembling the planar conductive element 460 with the plastic barrel 100 without tilt. In the 1st embodiment, the planar conductive element 460 is an elastic member having two spring pieces separated from each other. The planar conductive element 460 is disposed in the assembling method to the fixing structure 127.

In FIG. 7 and FIG. 8, the positions of the gate traces 128a and 128b in the 1st embodiment would not affect the assembling between the mounting structure 121 and the planar conductive element 460, and between the mounting structure 121 and the wiring element 470. Therefore, it is favorable for maintaining the compact size improving the molding quality of the plastic barrel 100 by the positions of the gate traces 128a and 128b.

In FIG. 1, FIG. 2 and FIG. 3, the annular groove structure 122 includes an object-side side wall 123 and an image-side side wall 125, the object-side side wall 123 is disposed around the surface 130 of the outer portion 120, the image-side side wall 125 is disposed around the surface 130 of the outer portion 120, the image-side side wall 125 is corresponding to the object-side side wall 123, and the object-side side wall 123 includes at least three notches 124. Therefore, it is favorable for reducing the difficulty of the release by enhancing the smoothness of the releasing step of the injection molding.

In FIG. 2, the fixing structure 127 is adjacent to the image-side side wall 125 of the annular groove structure 122, and the image-side side wall 125 has uneven thickness. The aforementioned "uneven thickness" of the image-side side wall 125 means that the image-side side wall 125 includes at least two thicknesses; in the 1st embodiment, the image-side side wall 125 includes a thickness d1 and a thickness d2, wherein the thickness d2 is greater than the thickness d1.

In FIG. 3 and FIG. 4, when twice a shortest distance between the gate traces 128a, 128b and the central axis O of the plastic barrel 100 is $\phi g$ (in FIG. 3, $\phi g$ is the twice the shortest distance between the gate traces 128b and the central axis O of the plastic barrel 100), and the diameter of the image-side opening 114 is $\phi i$, the following condition is satisfied: $0.80<\phi g/\phi i<1.40$. Therefore, the positions of the gate traces 128a and 128b are close to the image-side opening 114, which can reduce the disorder of the plastic material flow, so that the plastic material can be naturally filled at the position near the image-side opening 114, rather than be pushed in a specific direction. Further, the following condition can be satisfied: $1.0<\phi g/\phi i<1.35$. Therefore, it is favorable for achieving a mold cavity design being smooth and without ruggedness. In the 1st embodiment, the mounting structure 121 includes four gate traces, which are two gate traces 128a and two gate traces 128b. The shortest distance between each of the gate traces 128a and the central axis O of the plastic barrel 100 is smaller than the shortest distance between each of the gate traces 128b and the central axis O of the plastic barrel 100, as shown in FIG. 3. However, the present disclosure is not limited thereto. In other embodiments, the number and the position of gate traces can be adjusted on demand.

In FIG. 5, when a diameter of a bottom 126 of the annular groove structure 122 is $\phi b$, and the diameter of the image-side opening 114 is $\phi i$, the following condition is satisfied: $\phi b>\phi i$. Therefore, it is favorable for controlling the thickness of the plastic barrel 100 so as to avoid excessive thickness of partial plastic barrel 100. The surface quality of the plastic barrel 100 would be unstable, such as flow mark or surface white speckle, when the excessive thickness of partial plastic barrel 100 exists.

In the 1st embodiment, values of parameters $\phi o$, $\phi i$, $\phi g$, $\phi b$, $\phi o/\phi i$ and $\phi g/\phi i$ are listed in Table 1.

TABLE 1

| $\phi o$ [mm] | 2.11 | $\phi b$ [mm] | 6.3 |
|---|---|---|---|
| $\phi i$ [mm] | 5.7792 | $\phi o/\phi i$ | 0.37 |
| $\phi g$ [mm] | 6.57, 6.91 | $\phi g/\phi i$ | 1.14, 1.20 |

Note:
The two values of $\phi g$ in Table 1 are twice the shortest distance between each of the gate traces 128a and 128b and the central axis O of the plastic barrel 100, respectively.

2nd Embodiment

Figure 9:
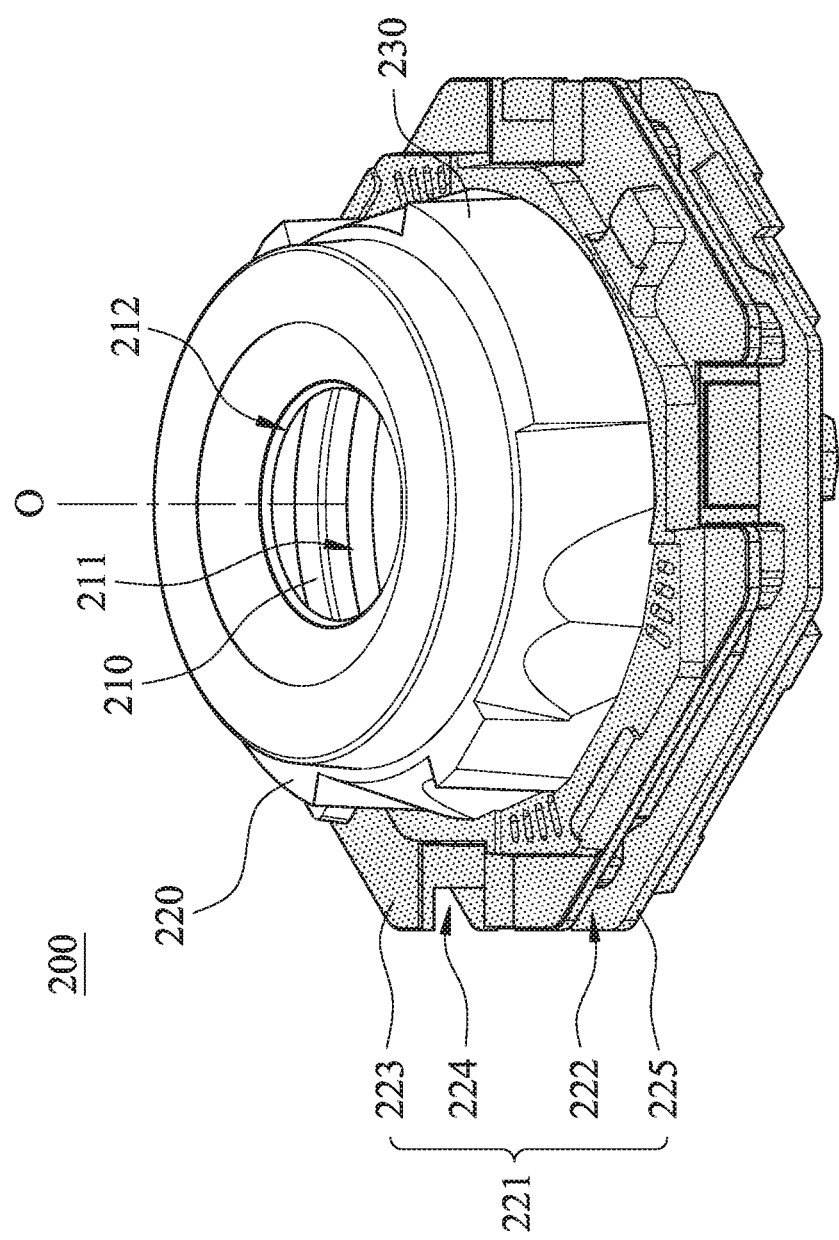
FIG. 9 is a three-dimensional view of a plastic barrel according to the 2nd embodiment of the present disclosure.
Figure 10:
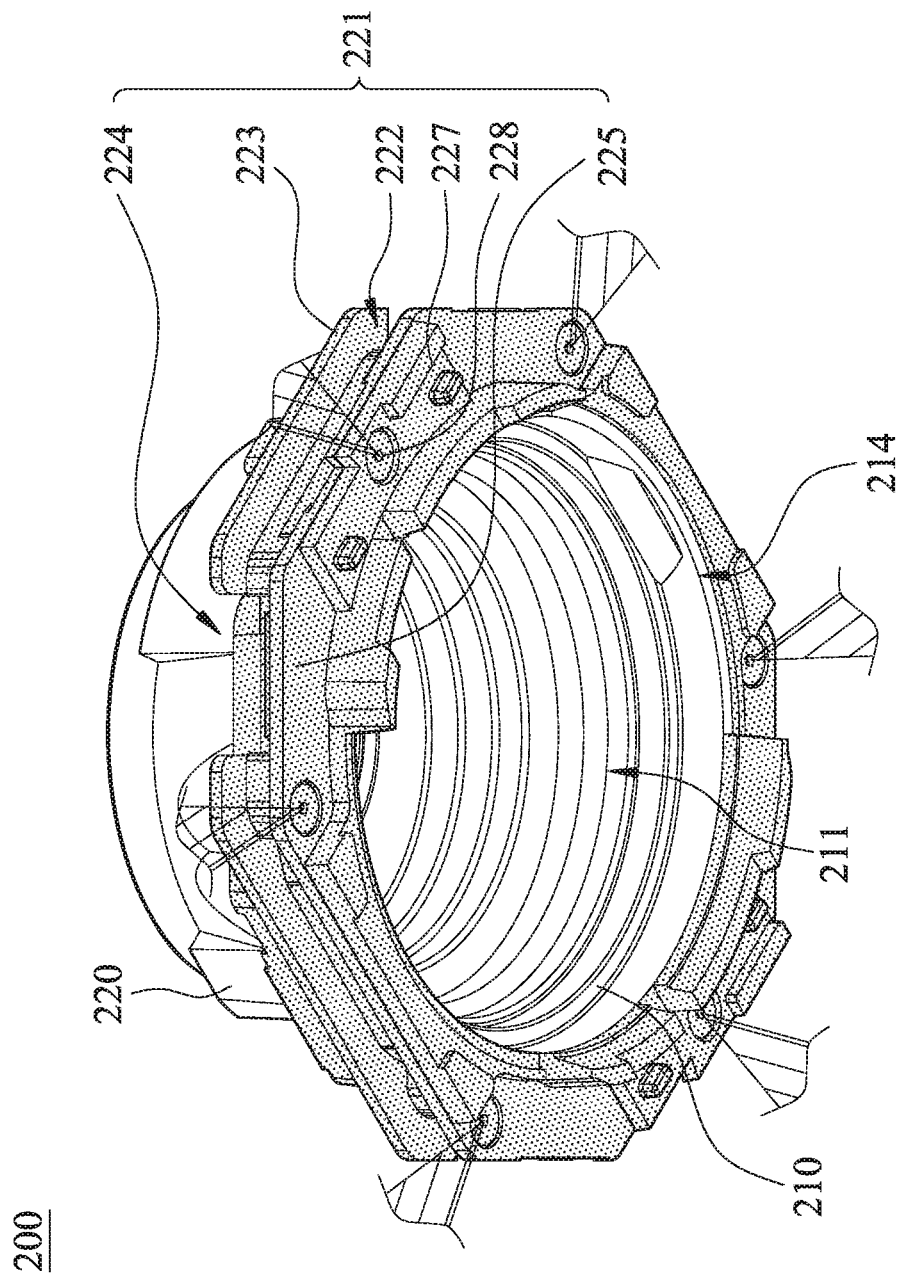
FIG. 10 is another three-dimensional view of the plastic barrel of FIG. 9.
Figure 11:
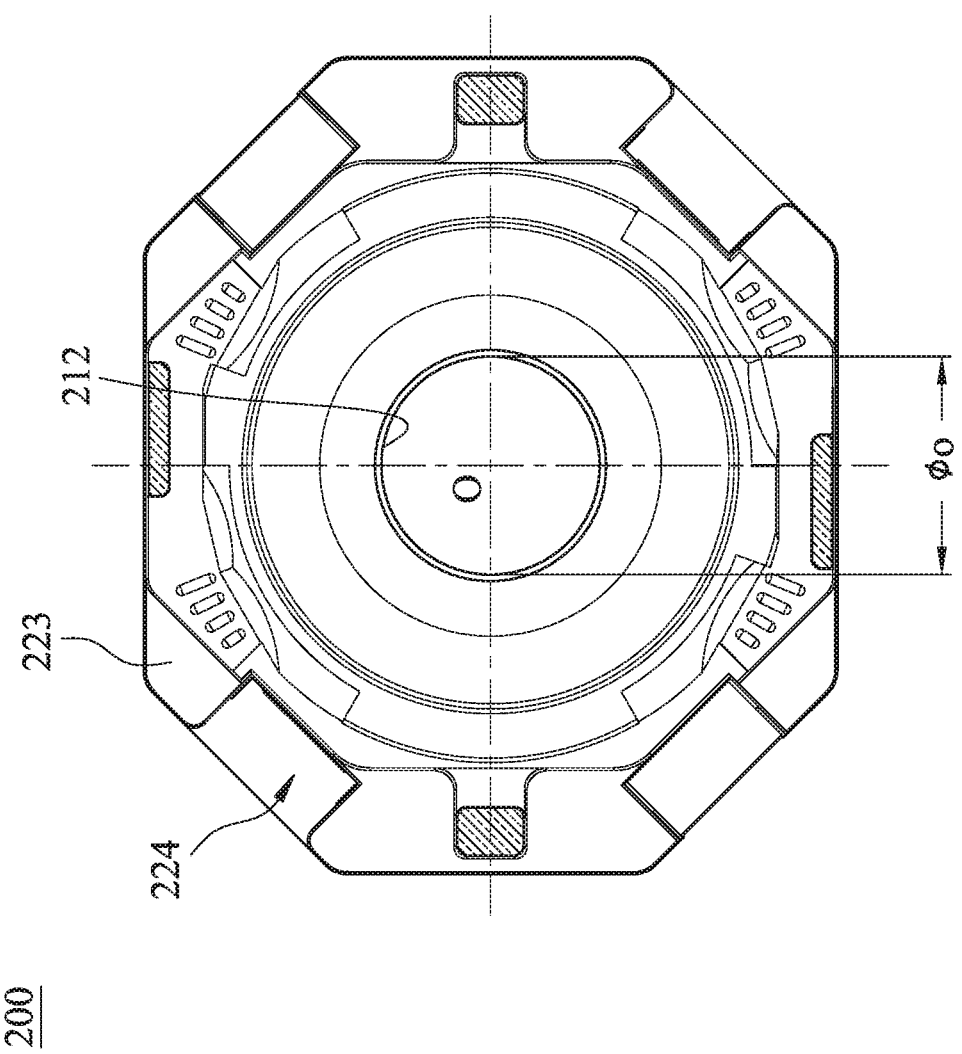
FIG. 11 is a top view of the plastic barrel of FIG. 9.
Figure 12:
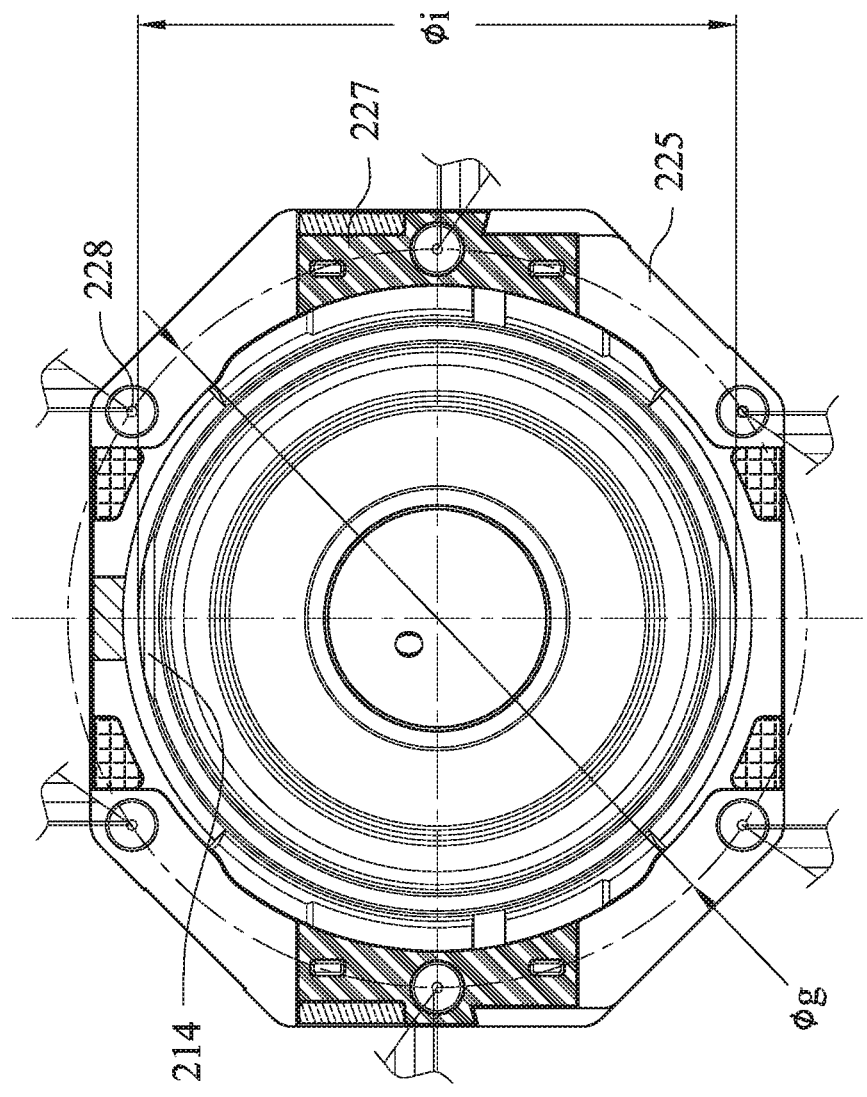
FIG. 12 is a bottom view of the plastic barrel of FIG. 9.

FIG. 9 is a three-dimensional view of a plastic barrel 200 according to the 2nd embodiment of the present disclosure. FIG. 10 is another three-dimensional view of the plastic barrel 200 of FIG. 9. FIG. 11 is a top view of the plastic barrel 200 of FIG. 9. FIG. 12 is a bottom view of the plastic barrel 200 of FIG. 9. In FIG. 9 to FIG. 12, the plastic barrel 200 includes an inner portion 210 and an outer portion 220. The inner portion 210 defines an interior space 211, the inner portion 210 includes, in order from an object side to an image side, an object-side opening 212, a plurality of inner annular surfaces (its reference numeral is omitted) and an image-side opening 214. The interior space 211 is configured for accommodating the imaging lens assembly (as shown in FIG. 6), and the imaging lens assembly includes a plurality of plastic lens elements.

Figure 13:
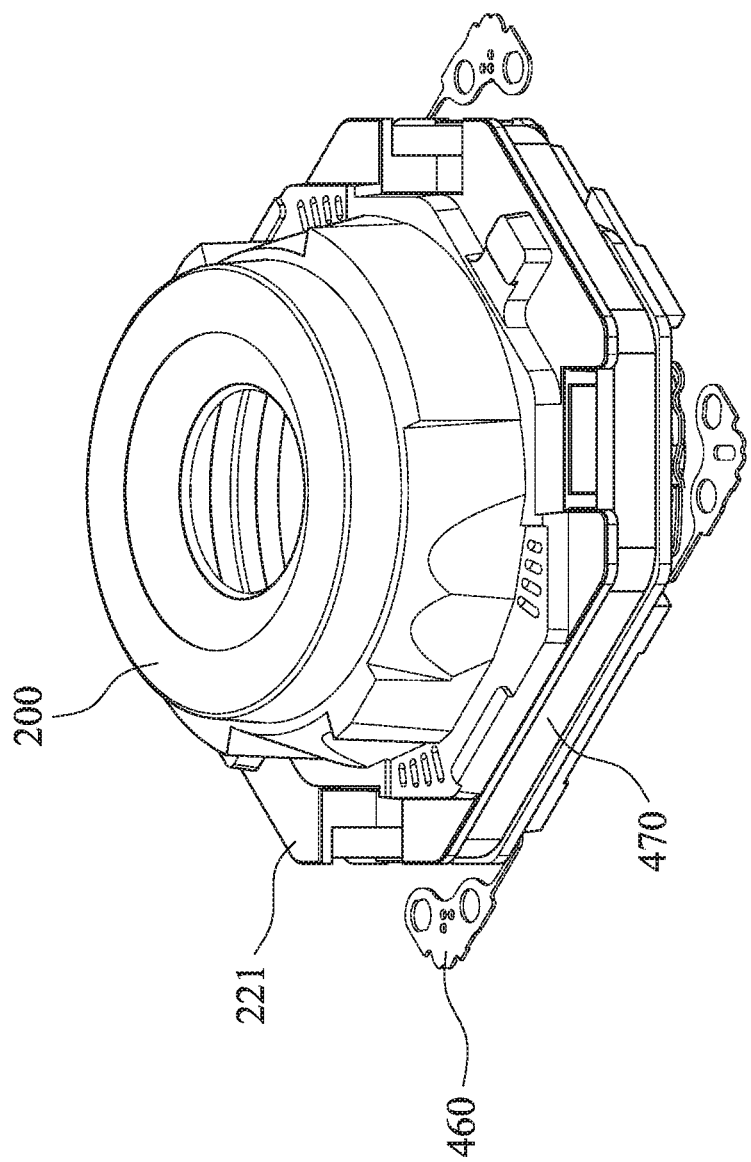
FIG. 13 is a three-dimensional view of the plastic barrel assembled to a planar conductive element and a wiring element of FIG. 9.
Figure 14:
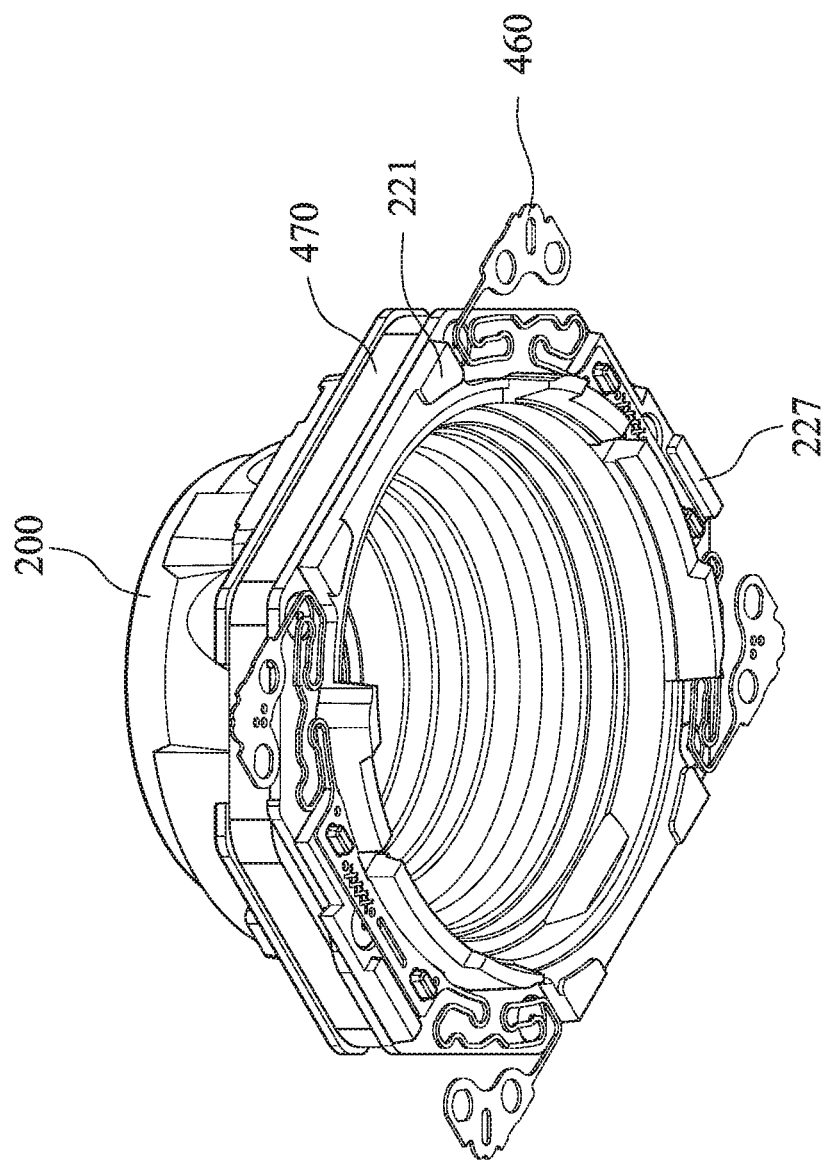
FIG. 14 is another three-dimensional view of the plastic barrel assembled to the planar conductive element and the wiring element of FIG. 9.

The outer portion 220 surrounds the inner portion 210. The outer portion 220 includes a mounting structure 221. According to the 2nd embodiment, the mounting structure 221 is illustrated with dots in FIG. 9 and FIG. 10, which is for easily identifying the mounting structure 221 and the mounting structure 221 is illustrated without dots in FIG. 11 to FIG. 14. The mounting structure 221 is disposed on a surface 230 of the outer portion 220, and the mounting structure 221 is injection molded for mounting a planar conductive element and a wiring element (as shown in FIG. 13 and FIG. 14). The mounting structure 221 includes at least three gate traces 228, the at least three gate traces 228 are located on a surface (its reference numeral is omitted) of the mounting structure 221. When a diameter of the object-side opening 212 is ϕo, and a diameter of the image-side opening 214 is ϕi, the following condition is satisfied: 0.05<ϕo/ϕi<0.80.

With the aforementioned structure, it is favorable for simplifying the flow of the plastic material in a mold so as to reduce the difficulty of injection molding, and increase the yield rate and the production efficiency.

In the 2nd embodiment, the plastic barrel 200 can be manufactured by injection molding, and the plastic barrel 200 can be a black single piece plastic body which is integrally formed. Specifically, the inner portion 210 and the outer portion 220 are integrally formed on the plastic barrel 200, that is, the mounting structure 221 of the outer portion 220 is also integrally formed on the plastic barrel 200. According to the conventional autofocus module (not shown), which provides the lens assembly and the carrier being two independent components, and the metal conductor components, such as the planar conductive element and the wiring element, being disposed on the carrier. However, the plastic barrel of the present disclosure can accommodate the imaging lens assembly and the metal conductor components at the same time. Therefore, the additional process of assembling the conventional lens assembly with the carrier can be omitted, and can avoid the pollution caused by the aforementioned assembling, and it is favorable for improving the tolerance of the conventional assembling by the precision of the mold design so as to improve the assembling accuracy.

In the 2nd embodiment, the aforementioned black single piece plastic body can be blended with the chemical fiber or the glass fiber. Therefore, it is favorable for increasing the fluidity of the plastic material so as to improve the molding quality, and when the glass fiber is blended, the structural strength of the plastic barrel 200 can be enhanced.

In the 2nd embodiment, the plastic barrel 200 can be a threadless structure. Therefore, the complexity of the mold design can be reduced by omitting the thread structure.

In FIG. 11 and FIG. 12, when the diameter of the object-side opening 212 is ϕo, and the diameter of the image-side opening 214 is ϕi, the following condition is satisfied: 0.10<ϕo/ϕi<0.60. Therefore, the plastic material in the mold can flow from peripheral region to the inner region along the radial direction, which is favorable for reducing the disorder of the plastic material flow.

The mounting structure 221 can further include an annular groove structure 222, the annular groove structure 222 is disposed on the surface 230 of the outer portion 220. FIG. 13 is a three-dimensional view of the plastic barrel 200 assembled to the planar conductive element 460 and the wiring element 470 of FIG. 9. FIG. 14 is another three-dimensional view of the plastic barrel 200 assembled to the planar conductive element 460 and the wiring element 470 of FIG. 13. As shown in FIG. 13 and FIG. 14, the annular groove structure 222 can be injection molded for mounting the wiring element 470, wherein the wiring element 470 can be wound with a wire having an insulating outer layer, such as an enameled wire. Therefore, it is favorable for regularly arranging the wiring element 470 on the outside of the plastic barrel 200, so as to improve the focusing efficiency of electromagnetic actuation. In the 2nd embodiment, the wiring element 470 is disposed in an assembling method to the annular groove structure 222.

In FIG. 10 and FIG. 14, the mounting structure 221 further includes a fixing structure 227, the fixing structure 227 is adjacent to the annular groove structure 222, and the fixing structure 227 is injection molded for mounting the planar conductive element 460. Therefore, it is favorable for stably assembling the planar conductive element 460 with the plastic barrel 200 with the plastic barrel 200 without tilt. In the 2nd embodiment, the planar conductive element 460 is an elastic member having two spring pieces separated from each other. The planar conductive element 460 is disposed in the assembling method to the fixing structure 227.

In FIG. 10 and FIG. 14, the positions of the gate traces 228 in the 2nd embodiment would not affect the assembling between the mounting structure 221 and the planar conductive element 460, and between the mounting structure 221 and the wiring element 470. Therefore, it is favorable for maintaining the compact size improving the molding quality of the plastic barrel 200 by the positions of the gate traces 228.

In FIG. 9, FIG. 10 and FIG. 11, the annular groove structure 222 includes an object-side side wall 223 and an image-side side wall 225, the object-side side wall 223 is disposed around the surface 230 of the outer portion 220, the image-side side wall 225 is disposed around the surface 230 of the outer portion 220, the image-side side wall 225 is corresponding to the object-side side wall 223, and the object-side side wall 223 includes at least three notches 224. Therefore, it is favorable for reducing the difficulty of the release by enhancing the smoothness of the releasing step of the injection molding.

In FIG. 10, the fixing structure 227 is adjacent to the image-side side wall 225 of the annular groove structure 222, and the image-side side wall 225 has uneven thickness.

In FIG. 12, when twice a shortest distance between the gate traces 228 and the central axis O of the plastic barrel 200 is ϕg, and the diameter of the image-side opening 214 is ϕi, the following condition is satisfied: 0.80<ϕg/ϕi<1.40. Therefore, the positions of the gate traces 228 are close to the image-side opening 214, which can reduce the disorder of the plastic material flow, so that the plastic material can be naturally filled at the position near the image-side opening 214, rather than be pushed in a specific direction. Further, the following condition can be satisfied: 1.0<ϕg/ϕi<1.35. Therefore, it is favorable for achieving a mold cavity design being smooth and without ruggedness. In the 2nd embodiment, the mounting structure 221 includes six gate traces 228. The shortest distance between each of the gate traces 228 and the central axis O of the plastic barrel 200 are equal. However, the present disclosure is not limited thereto. In other embodiments, the number and the position of gate traces can be adjusted on demand.

When the diameter of the bottom (its reference numeral is omitted) of the annular groove structure 222 is ϕb (as shown in FIG. 5), and the diameter of the image-side opening 214 is ϕi, the following condition is satisfied: ϕb>ϕi. Therefore, it is favorable for controlling the thickness of the plastic barrel 200 so as to avoid excessive thickness of partial plastic barrel 200. The surface quality of the plastic barrel 200 would be unstable, such as flow mark or surface white speckle, when the excessive thickness of partial plastic barrel 200 exists.

In the 2nd embodiment, values of parameters ϕo, ϕi, ϕg, ϕb, ϕo/ϕi and ϕg/ϕi are listed in Table 2.

TABLE 2

| ϕo [mm] | 2.11 | ϕb [mm] | 6.3 |
|---|---|---|---|
| ϕi [mm] | 5.7792 | ϕo/ϕi | 0.37 |
| ϕg [mm] | 7.13 | ϕg/ϕi | 1.23 |

3rd Embodiment

Figure 15:
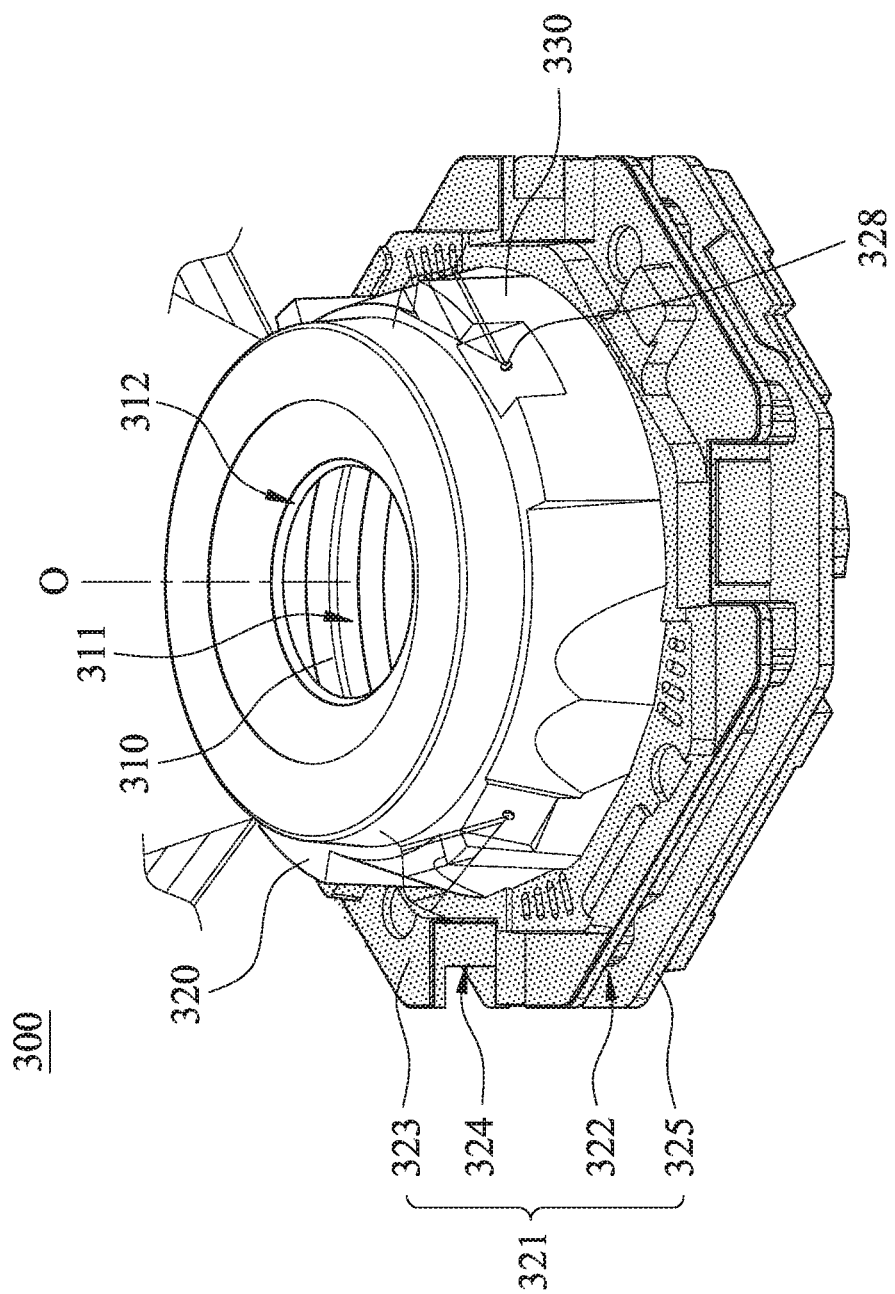
FIG. 15 is a three-dimensional view of a plastic barrel according to the 3rd embodiment of the present disclosure.
Figure 16:
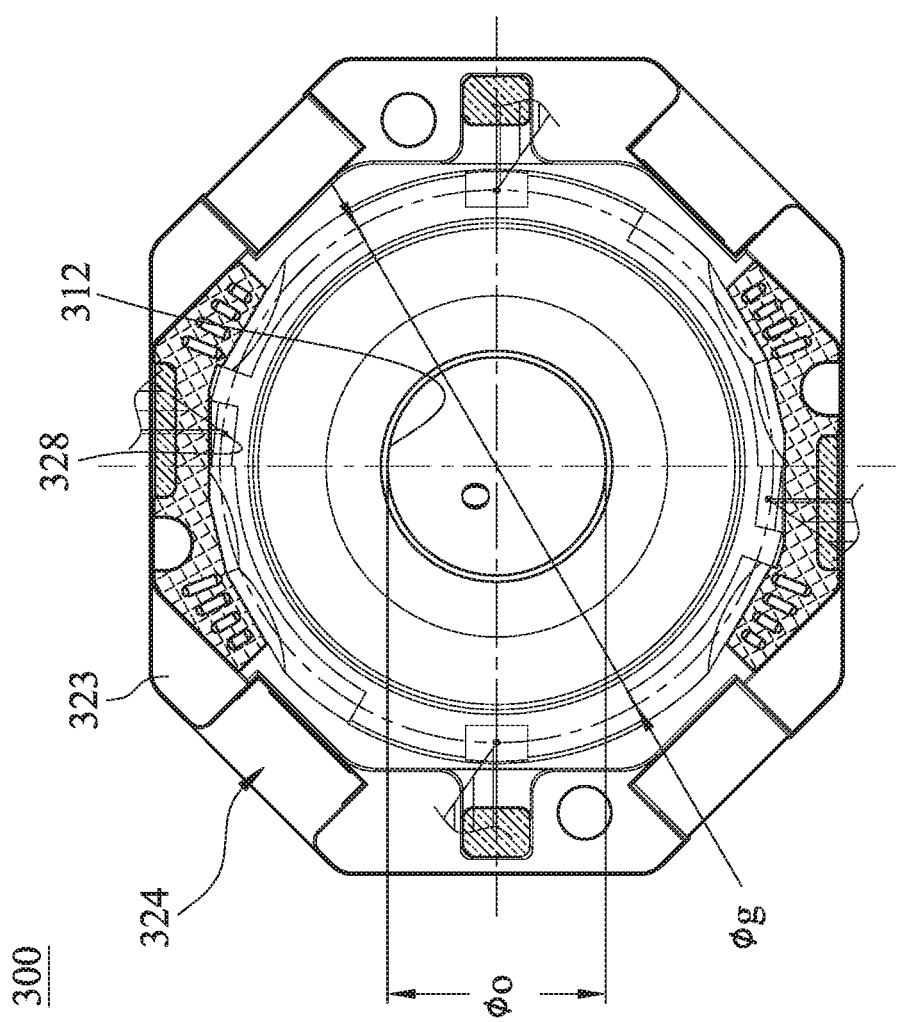
FIG. 16 is a top view of the plastic barrel of FIG. 15.
Figure 17:
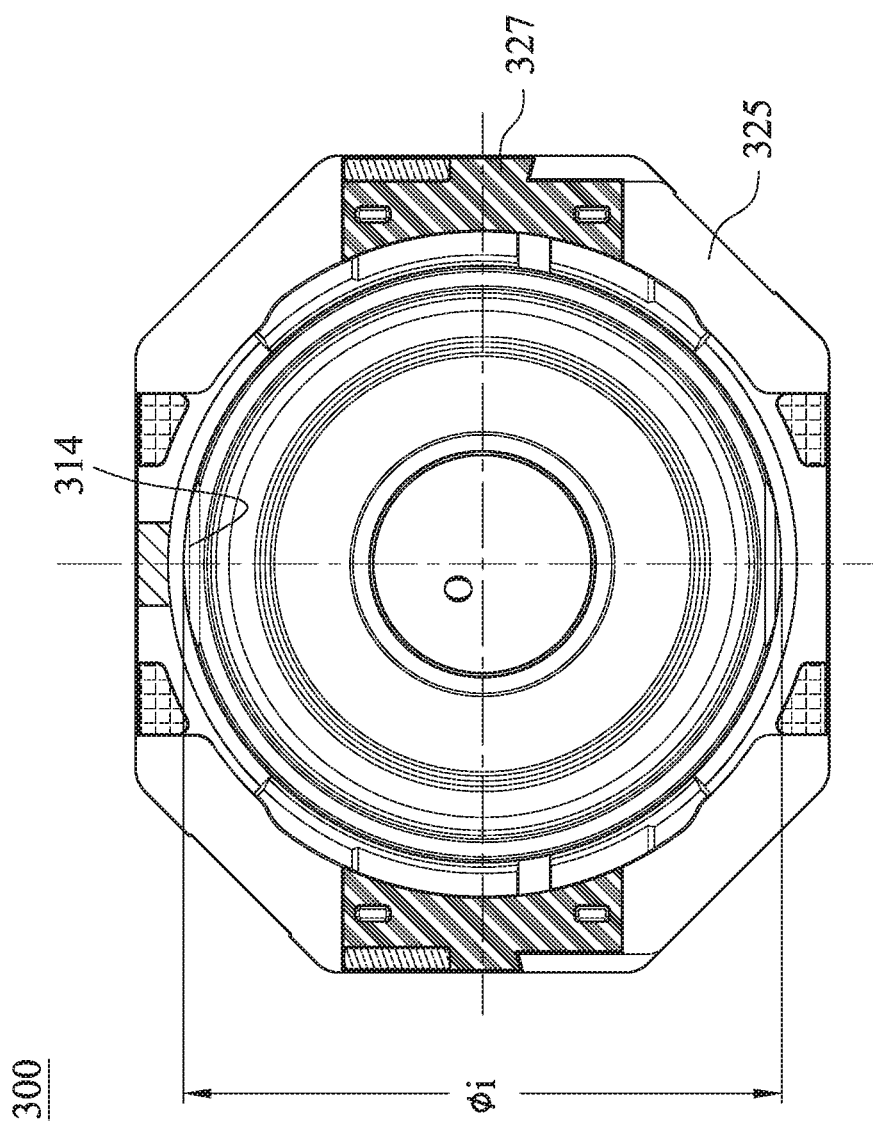
FIG. 17 is a bottom view of the plastic barrel of FIG. 15.

FIG. 15 is a three-dimensional view of a plastic barrel 300 according to the 3rd embodiment of the present disclosure. FIG. 16 is a top view of the plastic barrel 300 of FIG. 15. FIG. 17 is a bottom view of the plastic barrel 300 of FIG. 15. The plastic barrel 300 includes an inner portion 310 and an outer portion 320. The inner portion 310 defines an interior space 311, in order from an object side to an image side, an object-side opening 312, a plurality of inner annular surfaces (its reference numeral is omitted) and an image-side opening 314. The interior space 311 is configured for accommodating the imaging lens assembly (as shown in FIG. 6), and the imaging lens assembly includes a plurality of plastic lens elements.

The outer portion 320 surrounds the inner portion 310. The outer portion 320 includes a mounting structure 321 and at least three gate traces 328. According to the 3rd embodiment, the mounting structure 321 is illustrated with dots in FIG. 15, which is for easily identifying the mounting structure 321 and the mounting structure 321 is illustrated without dot in FIG. 16 and FIG. 17. The mounting structure 321 is disposed on a surface 330 of the outer portion 320, and the mounting structure 321 is injection molded for mounting the planar conductive element and the wiring element (as shown in FIG. 13 and FIG. 14). The mounting structure 321 includes an annular groove structure 322, the annular groove structure 322 is disposed on the surface 330 of the outer portion 320, the annular groove structure 322 is injection molded for mounting the wiring element (as shown in FIG. 13 and FIG. 14). When the diameter of the object-side opening 312 is $\phi o$, and the diameter of the image-side opening 314 is $\phi i$, the following condition is satisfied: $0.05<\phi o/\phi i<0.80$.

With the aforementioned structure, it is favorable for simplifying the flow of the plastic material in a mold so as to reduce the difficulty of injection molding, and increase the yield rate and the production efficiency.

In the 3rd embodiment, the plastic barrel 300 can be manufactured by injection molding, and the plastic barrel 300 can be a black single piece plastic body which is integrally formed. Specifically, the inner portion 310 and the outer portion 320 are integrally formed on the plastic barrel 300, that is, the mounting structure 321 of the outer portion 320 is also integrally formed on the plastic barrel 300. According to the conventional autofocus module (not shown), which provides the lens assembly and the carrier being two independent components, and the metal conductor components, such as the planar conductive element and the wiring element, being disposed on the carrier. However, the plastic barrel of the present disclosure can accommodate the imaging lens assembly and the metal conductor components at the same time. Therefore, the additional process of assembling the conventional lens assembly with the carrier can be omitted, and can avoid the pollution caused by the aforementioned assembling, and it is favorable for improving the tolerance of the conventional assembling by the precision of the mold design so as to improve the assembling accuracy.

In the 3rd embodiment, the black single piece plastic body can be blended with the chemical fiber or the glass fiber. Therefore, it is favorable for increasing the fluidity of the plastic material so as to improve the molding quality, and when the glass fiber is blended, the structural strength of the plastic barrel 300 can be enhanced.

In the 3rd embodiment, the plastic barrel 300 can be a threadless structure. Therefore, the complexity of the mold design can be reduced by omitting the thread structure.

When the diameter of the object-side opening 312 is $\phi o$, and the diameter of the image-side opening 314 is $\phi i$, the following condition is satisfied: $0.10<\phi o/\phi i<0.60$. Therefore, the plastic material in the mold can flow from the peripheral region to the inner region along the radial direction, which is favorable for reducing the disorder of the plastic material flow.

In FIG. 17, the mounting structure 321 further includes a fixing structure 327, the fixing structure 327 is adjacent to the annular groove structure 322, and the fixing structure 327 is injection molded for mounting the planar conductive element (as shown in FIG. 13 and FIG. 14). Therefore, it is favorable for stably assembling the planar conductive element with the plastic barrel 300 without tilt.

In FIG. 15 and FIG. 16, the positions of the gate traces 328 in the 3rd embodiment would not affect the assembling between the mounting structure 321 and the planar conductive element, and between the mounting structure 321 and the wiring element. Therefore, it is favorable for maintaining the compact size improving the molding quality of the plastic barrel 300 by the positions of the gate traces 328.

In FIG. 15, the annular groove structure 322 includes an object-side side wall 323 and an image-side side wall 325, the object-side side wall 323 is disposed around the surface 330 of the outer portion 320, the image-side side wall 325 is disposed around the surface 330 of the outer portion 320, the image-side side wall 325 is corresponding to the object-side side wall 323, and the object-side side wall 323 includes at least three notches 324. Therefore, it is favorable for reducing the difficulty of the release by enhancing the smoothness of the releasing step of the injection molding.

In FIG. 15 and FIG. 17, the fixing structure 327 is adjacent to the image-side side wall 325 of the annular groove structure 322, and the image-side side wall 325 has uneven thickness.

In FIG. 16 and FIG. 17, when twice the shortest distance between each of the gate traces 328 and a central axis O of the plastic barrel 300 is $\phi g$, and the diameter of the image-side opening 314 is $\phi i$, the following condition is satisfied: $0.80<\phi g/\phi i<1.40$. Therefore, the positions of the gate traces 328 are close to the image-side opening 314, which can reduce the disorder of the plastic material flow, so that the plastic material can be naturally filled at the position near the image-side opening 314, rather than be pushed in a specific direction. Further, the following condition can be satisfied: $1.0<\phi g/\phi i<1.35$. Therefore, it is favorable for achieving a mold cavity design being smooth and without ruggedness. In the 3rd embodiment, the mounting structure 321 includes four gate traces 328, the shortest distance between each of the gate traces 328 and the central axis O of the plastic barrel 300 are equal. However, the present disclosure is not limited thereto. In other embodiments, the number and the position of gate traces can be adjusted on demand.

When the diameter of the bottom (its reference numeral is omitted) of the annular groove structure 322 is $\phi b$ (as shown FIG. 5), and the diameter of the image-side opening 314 is $\phi i$, the following condition is satisfied: $\phi b>\phi i$. Therefore, it is favorable for controlling the thickness of the plastic barrel 300 so as to avoid excessive thickness of partial plastic barrel 300. The surface quality of the plastic barrel 300 would be unstable, such as flow mark or surface white speckle, when the excessive thickness of partial plastic barrel 300 exists.

In the 3rd embodiment, values of parameters φo, φi, φg, φb, φo/φi and φg/φi are listed in Table 3.

TABLE 3

| | | | |
|---|---|---|---|
| φo [mm] | 2.11 | φb [mm] | 6.3 |
| φi [mm] | 5.7792 | φo/φi | 0.37 |
| φg [mm] | 5.35 | φg/φi | 0.93 |

4th Embodiment

Figure 18:
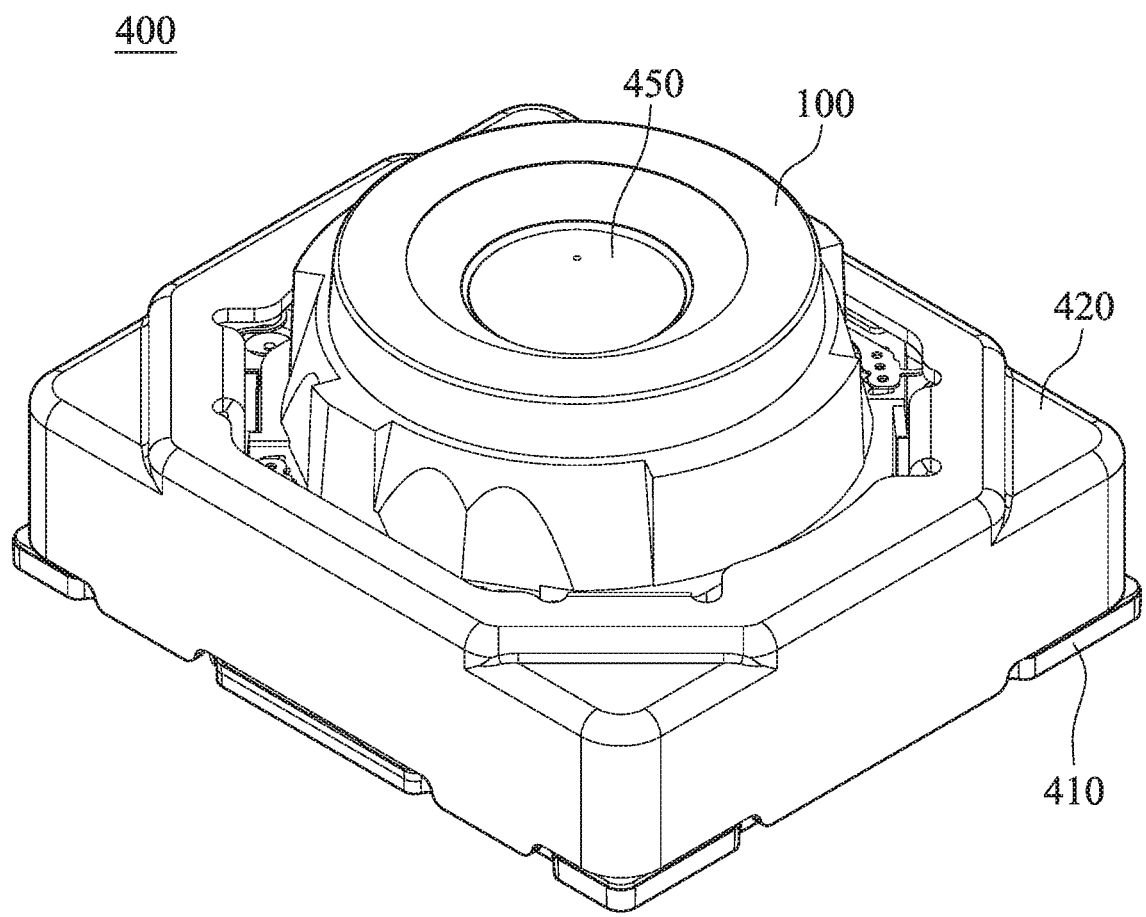
FIG. 18 is a three-dimensional view of an autofocus module according to the 4th embodiment of the present disclosure.
Figure 19:
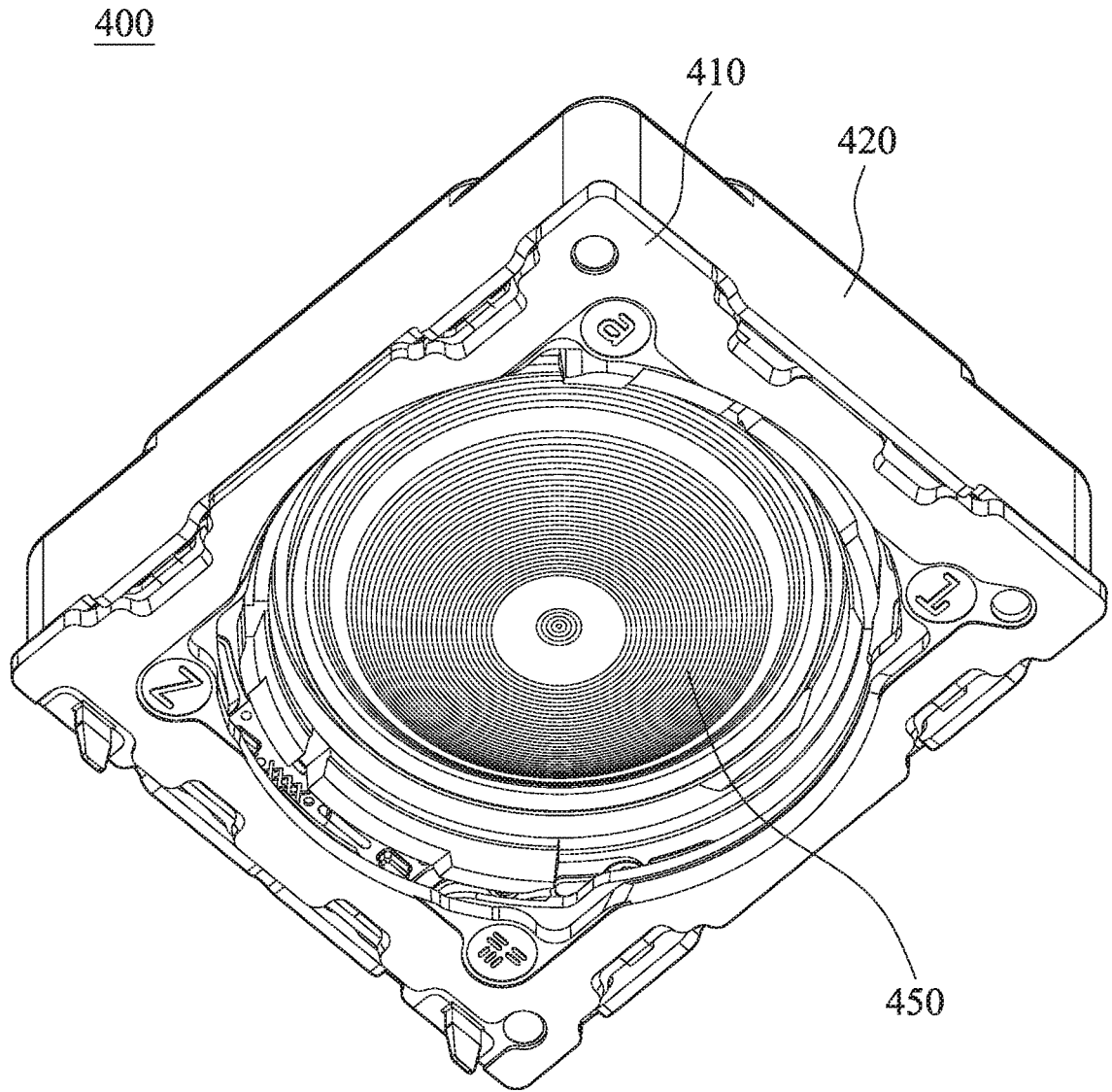
FIG. 19 is another three-dimensional view of the autofocus module of FIG. 18.
Figure 20:
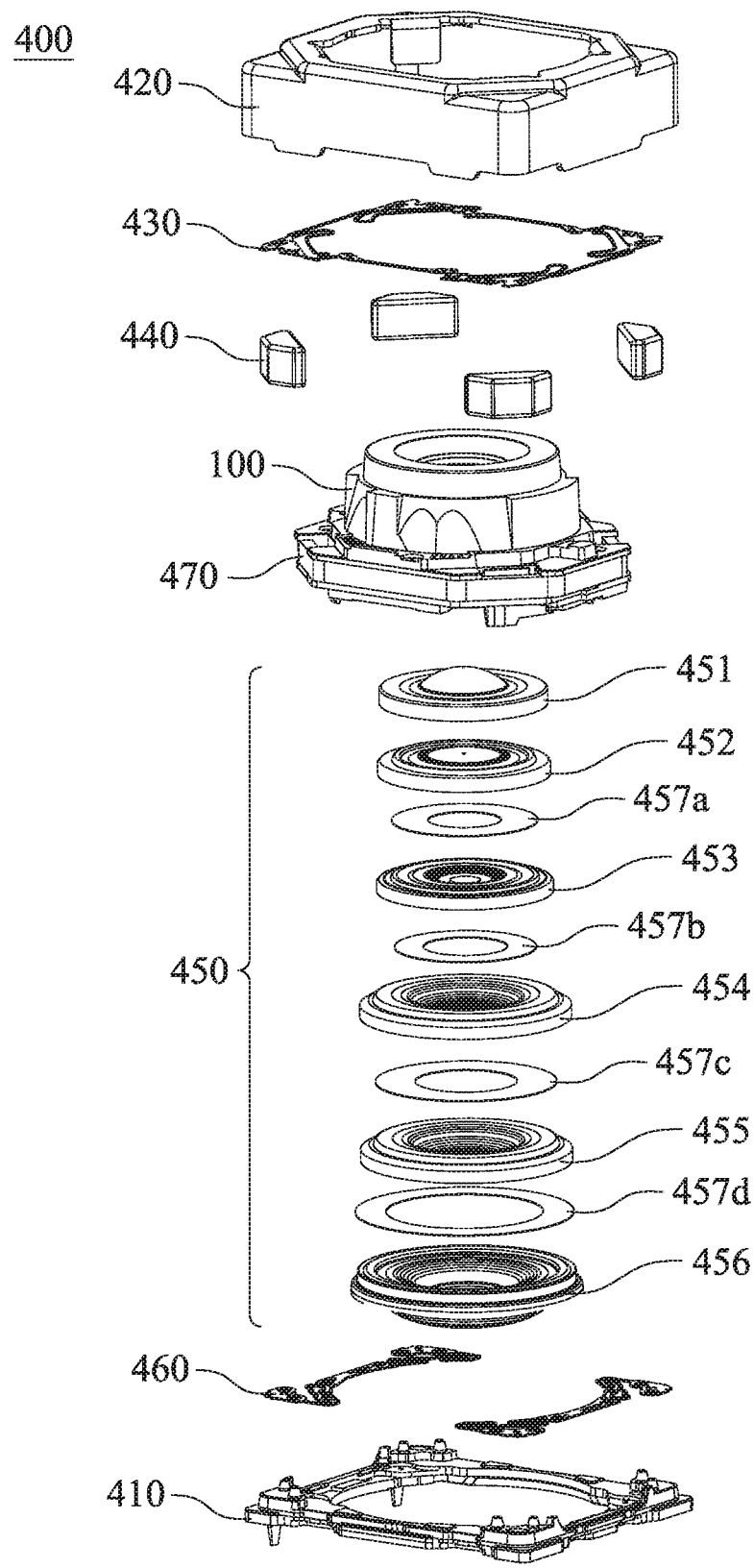
FIG. 20 is an explored schematic view of the autofocus module of FIG. 18.
Figure 21:
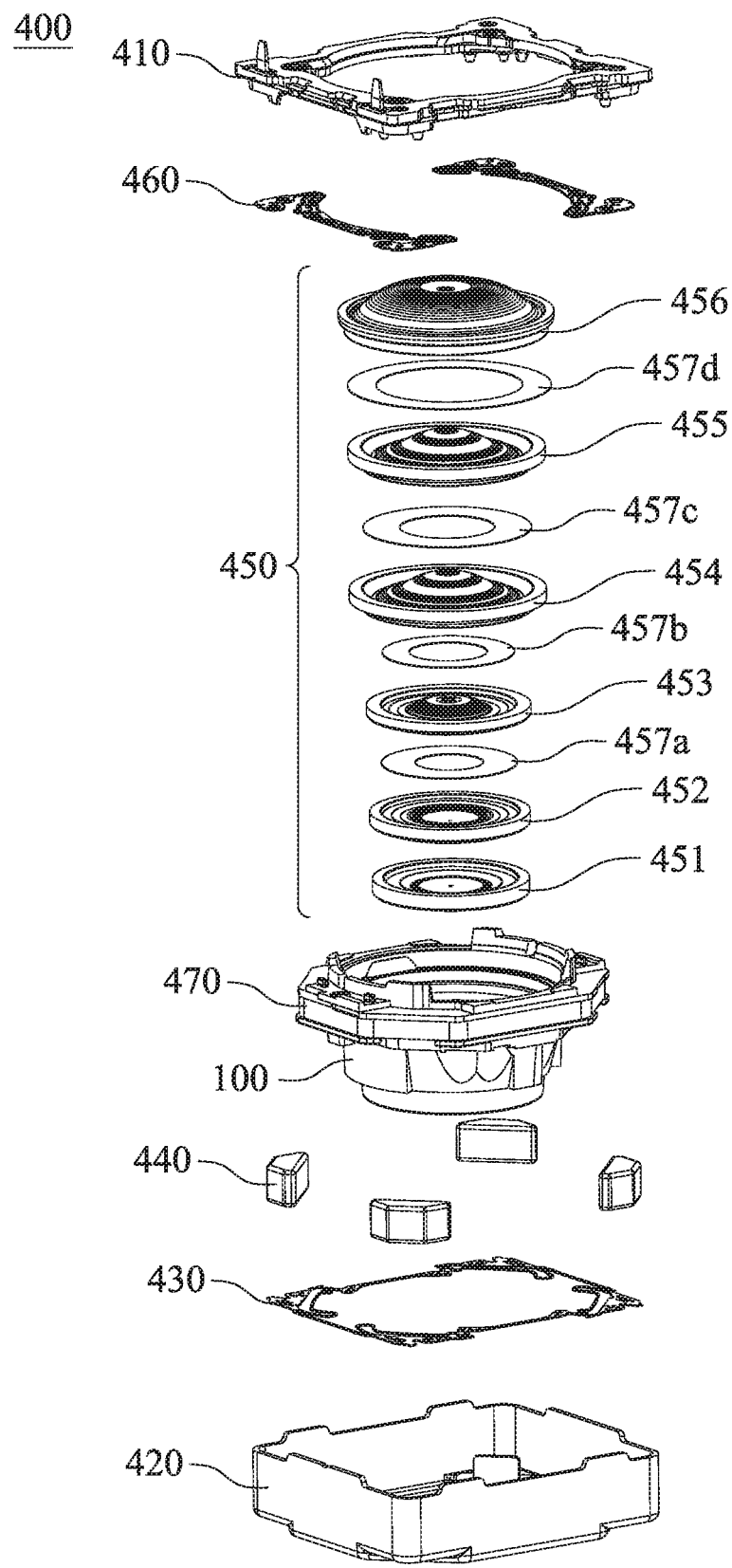
FIG. 21 is another explored schematic view of the autofocus module of FIG. 18.

FIG. 18 is a three-dimensional view of an autofocus module 400 according to the 4th embodiment of the present disclosure. FIG. 19 is another three-dimensional view of the autofocus module 400 of FIG. 18. FIG. 20 is an explored schematic view of the autofocus module 400 of FIG. 18. FIG. 21 is another explored schematic view of the autofocus module 400 of FIG. 18. In FIG. 18 to FIG. 21, the autofocus module 400 includes a plastic barrel 100 and an imaging lens assembly 450, the imaging lens assembly 450 is disposed in an interior space 111 of the plastic barrel 100 (as shown in FIG. 6). Therefore, when the plastic barrel 100 is manufactured, it is favorable for simplifying the flow of the plastic material in a mold so as to reduce the difficulty of injection molding and increase the yield rate and the production efficiency.

In detail, the autofocus module 400 includes a metal yoke 420, a planar conductive element 430, a plurality of magnets 440, the plastic barrel 100, a wiring element 470, the imaging lens assembly 450, a planar conductive element 460 and a holder 410. The metal yoke 420 is coupled to the holder 410 to form an accommodation space (its reference numeral is omitted) for the planar conductive element 430, the magnets 440, the plastic barrel 100, the wiring element 470, the imaging lens assembly 450 and the planar conductive element 460 to be disposed therein. The imaging lens assembly 450 includes six plastic lens elements, which are, in order from the object side to the image side, the plastic lens element 451, the plastic lens element 452, the plastic lens element 453, the plastic lens element 454, the plastic lens element 455, and the plastic lens element 456, and the imaging lens assembly 450 further includes the spacer element 457a, the spacer element 457b, the spacer element 457c and the spacer element 457d, the spacer element 457a is disposed between the plastic lens element 452 and plastic lens element 453, the spacer element 457b is disposed between the plastic lens element 453 and plastic lens element 454, the spacer element 457c is disposed between the plastic lens 454 element and plastic lens element 455, the spacer element 457d is disposed between the plastic lens element 455 and plastic lens element 456. The planar conductive element 460 includes two springs (its reference numeral is omitted) separated from each other, and the two springs are arranged on a same horizontal plane. The details of the plastic barrel 100 are the same as the aforementioned description of the 1st embodiment, and will not be described herein again.

In the 4th embodiment, the operation of the autofocus module 400 is as follows. An electronic signal is obtained by the autofocus module 400 according to the light entering into the imaging lens assembly 450 from an imaged object (not shown), and the electronic signal can be sent to an electronic driver (not shown), so that the electronic driver provides a driving current through the planar conductive element 460 to the wiring element 470, with an electromagnetic force generated by the interaction of the magnets 440 and the wiring element 470. Thus, the plastic barrel 100 can be driven to move the imaging lens assembly 450 along the direction parallel to the optical axis (not shown) so as to achieve the autofocus functionality. In the aforementioned focusing process, when the plastic barrel 100 is driven to move, a degree of freedom of the plastic barrel 100 along the direction parallel to the optical axis can be provided by the planar conductive element 430 and the planar conductive element 460. The planar conductive element 430 and the planar conductive element 460 are deformed along the movement of the plastic barrel 100, and provide a restoring force to the plastic barrel 100 when the plastic barrel 100 moves back to an initial position thereof.

5th Embodiment

Figure 22:
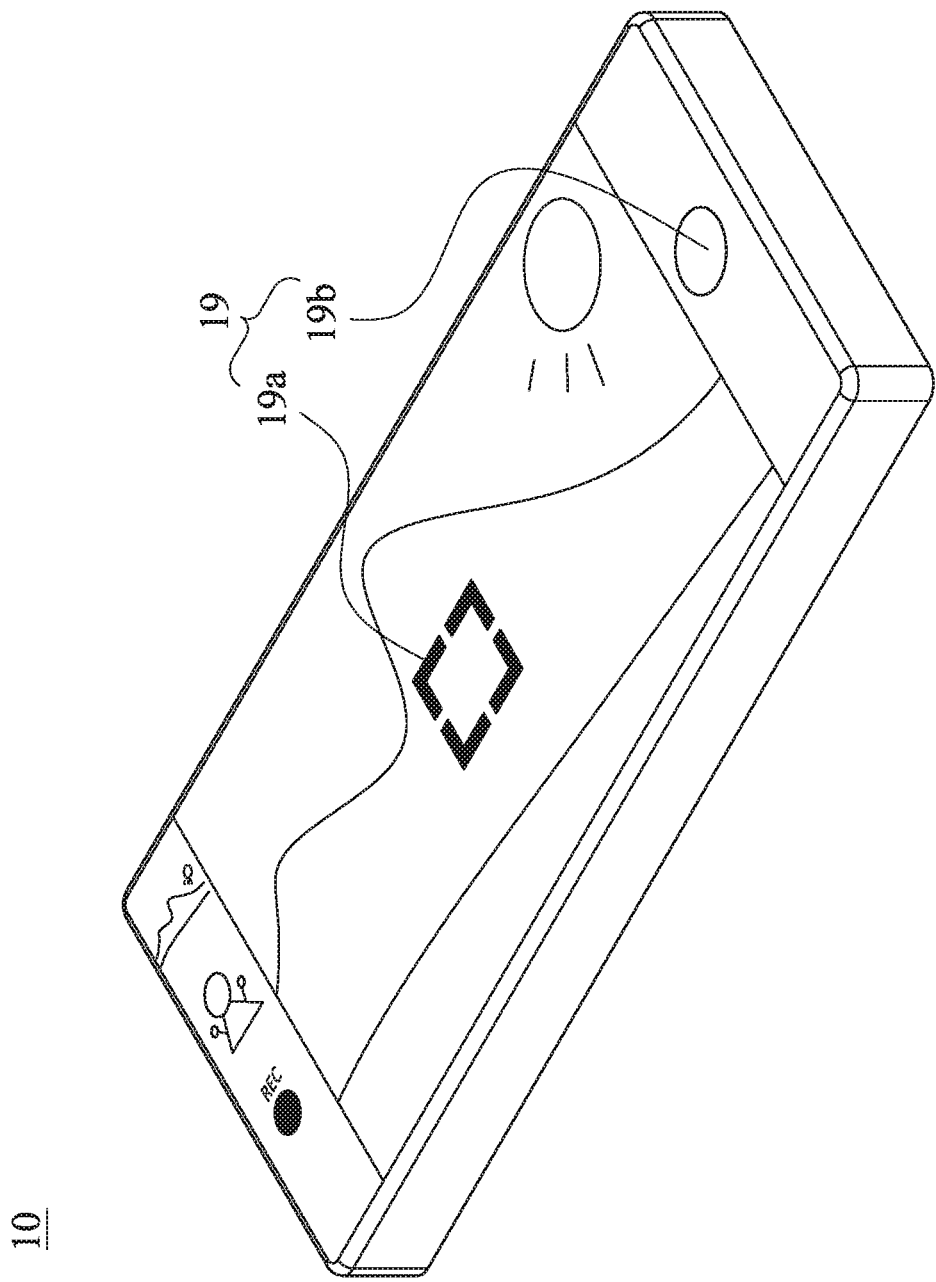
FIG. 22 is a schematic view of an electronic device according to the 5th embodiment of the present disclosure.
Figure 23:
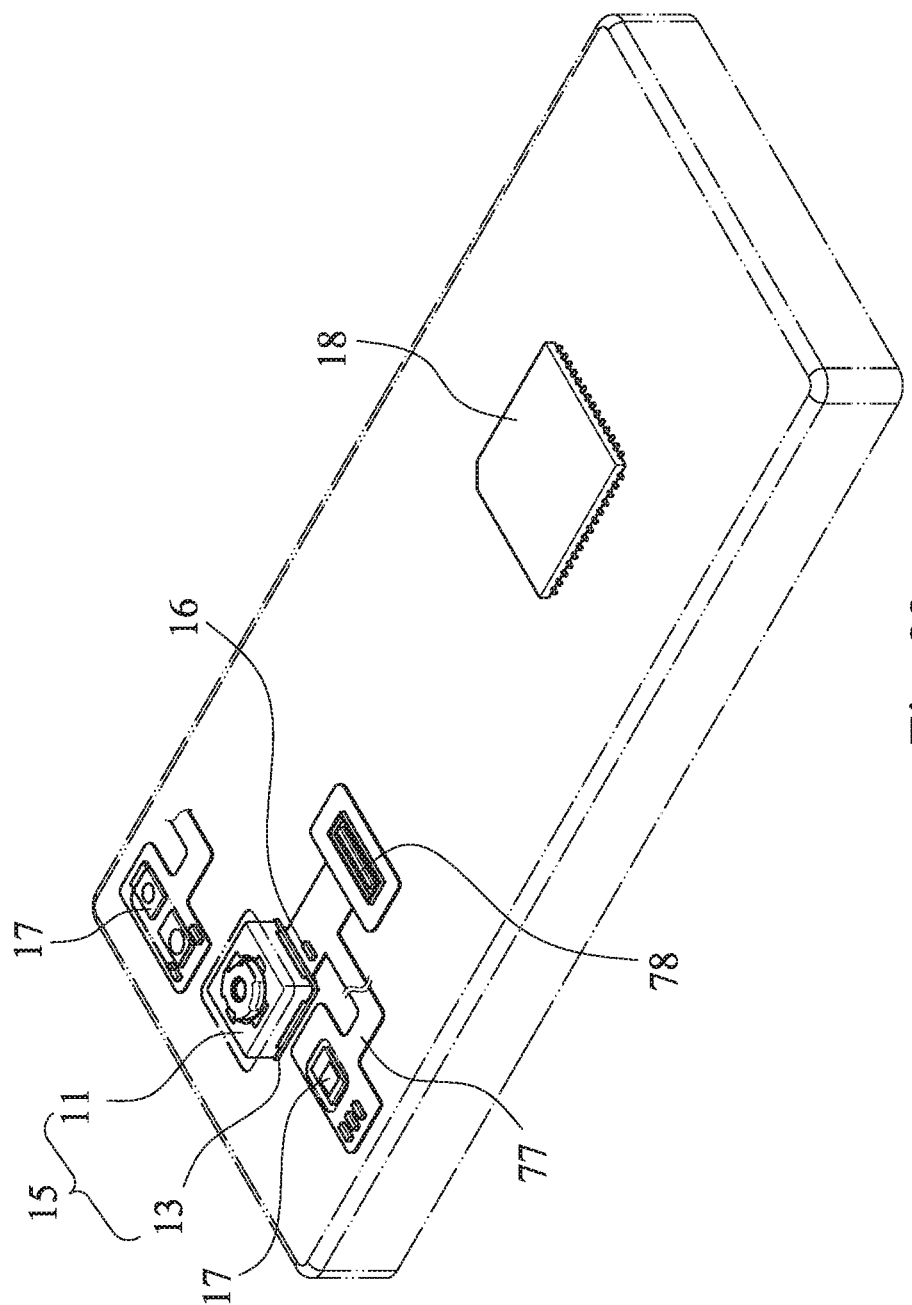
FIG. 23 is another schematic view of the electronic device of FIG. 22.
Figure 24:
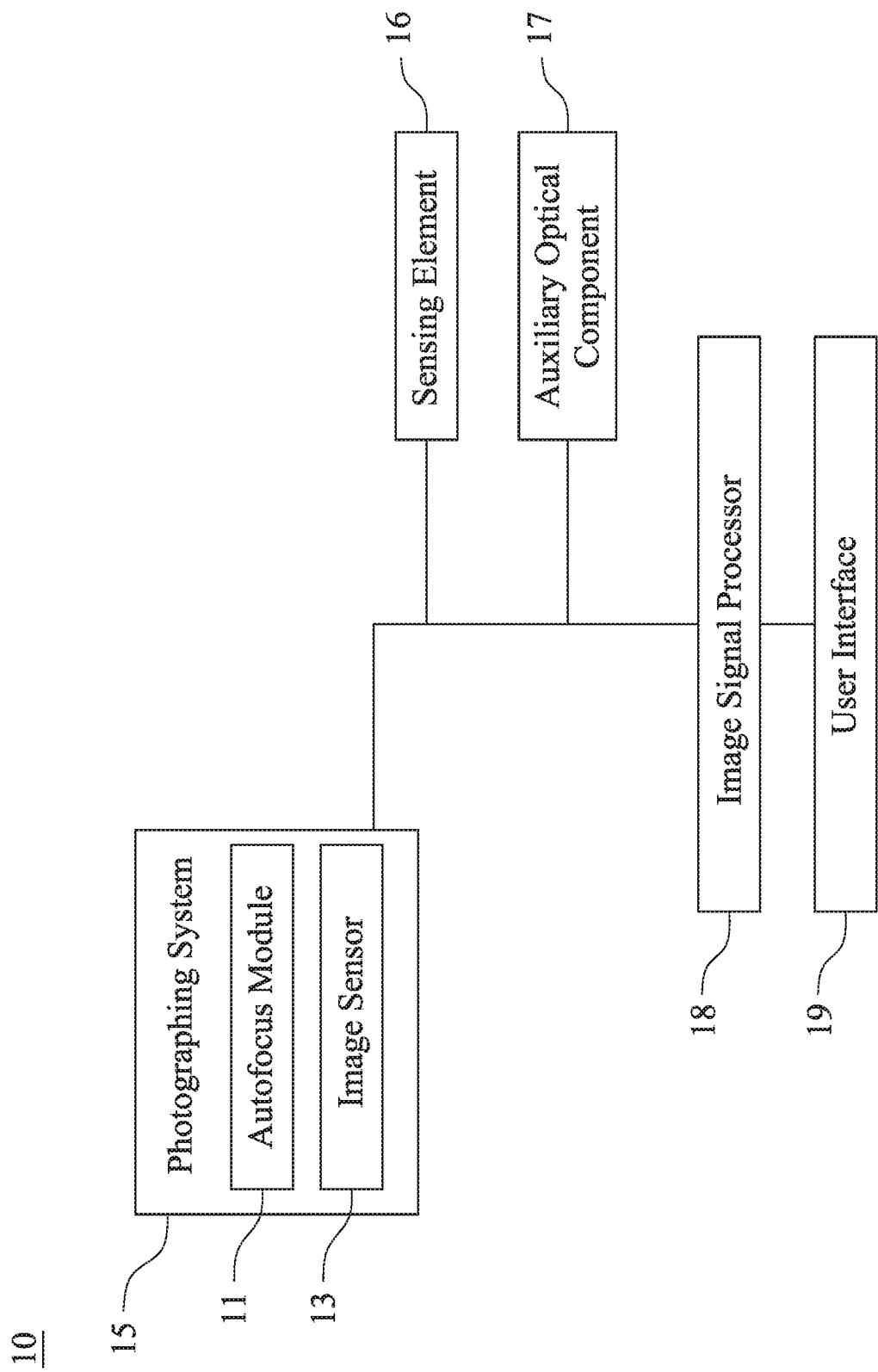
FIG. 24 is a block diagram of the electronic device of FIG. 22.

Please refer to FIG. 22, FIG. 23 and FIG. 24, FIG. 22 is a schematic view of an electronic device 10 according to the 5th embodiment of the present disclosure, FIG. 23 is another schematic view of the electronic device 10 of FIG. 22, and FIG. 24 is a block diagram of the electronic device 10 of FIG. 22, wherein FIG. 22 and FIG. 23 are schematic diagram of a camera in the electronic device 10, and FIG. 24 is the block diagram of the camera in the electronic device 10. In FIG. 22 and FIG. 23, the electronic device 10 of the 5th embodiment is a smart phone, the electronic device 10 includes a photographing system 15, wherein the photographing system 15 includes an autofocus module 11 according to the present disclosure and an image sensor 13. The image sensor 13 is disposed on an image surface (not shown) of the imaging lens assembly (its reference numeral is omitted) of the autofocus module 11 for receiving an imaging light from the imaging lens assembly. Therefore, it is favorable for the miniaturization of the electronic device 10 nowadays.

The electronic device 10 can further includes at least one sensing element 16, at least one auxiliary optical component 17, an image signal processor (ISP) 18, an user interface 19, a circuit board 77 and a connector 78, wherein the user interface 19 includes a touch screen 19a and a button 19b. Furthermore, the user activates the capturing mode by the user interface 19 (the touch screen 19a or the button 19b) of the electronic device 10. At this moment, the autofocus module 11 collects imaging light on the image sensor 13 and outputs electronic signals associated with images to the image signal processor 18.

The auxiliary optical component 17 can be a flash module for compensating color temperature, an infrared distance measurement component, a laser focus module, etc. The sensing element 16 can have functions for sensing physical momentum and kinetic energy, such as an accelerator, a gyroscope, a Hall Effect Element, to sense shaking or jitters applied by hands of the user or external environments. Accordingly, the functions of the autofocus module 11 of the photographing system 15 can be enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the autofocus function of what you see is what you get.

Furthermore, as shown in FIG. 23, the photographing system 15, the sensing element 16 and the auxiliary optical component 17 can be disposed on the circuit board 77 (the circuit board 77 is a flexible printed circuit board, FPC) and electrically connected with the associated components, such as the imaging signal processor 18, via the connector 78 to perform a capturing process. Since current smart phones have a tendency of being compact, in the 5th embodiment, the way of disposing the photographing system 15 and related components on the flexible printed circuit board 77 and then integrating the circuit thereof into the main board of the electronic device 10 via the connector 78 can satisfy the mechanical design of the limited space inside the electronic device 10 and the layout requirements and obtain more margins. The autofocus function of the photographing system 15 can also be controlled more flexibly via the touch screen 19a of the electronic device 10. In other embodiments (not shown herein), the sensing element 16 and the auxiliary optical component 17 can also be disposed on the main board of the electronic device 10 or carrier boards of other types according to requirements of the mechanical design and the circuit layout.

In addition, the electronic device 10 can further include but not be limited to a wireless communication unit, a control unit, a storage unit, a random access memory (RAM), a read-only memory (ROM), or a combination thereof.

6th Embodiment

Figure 25:
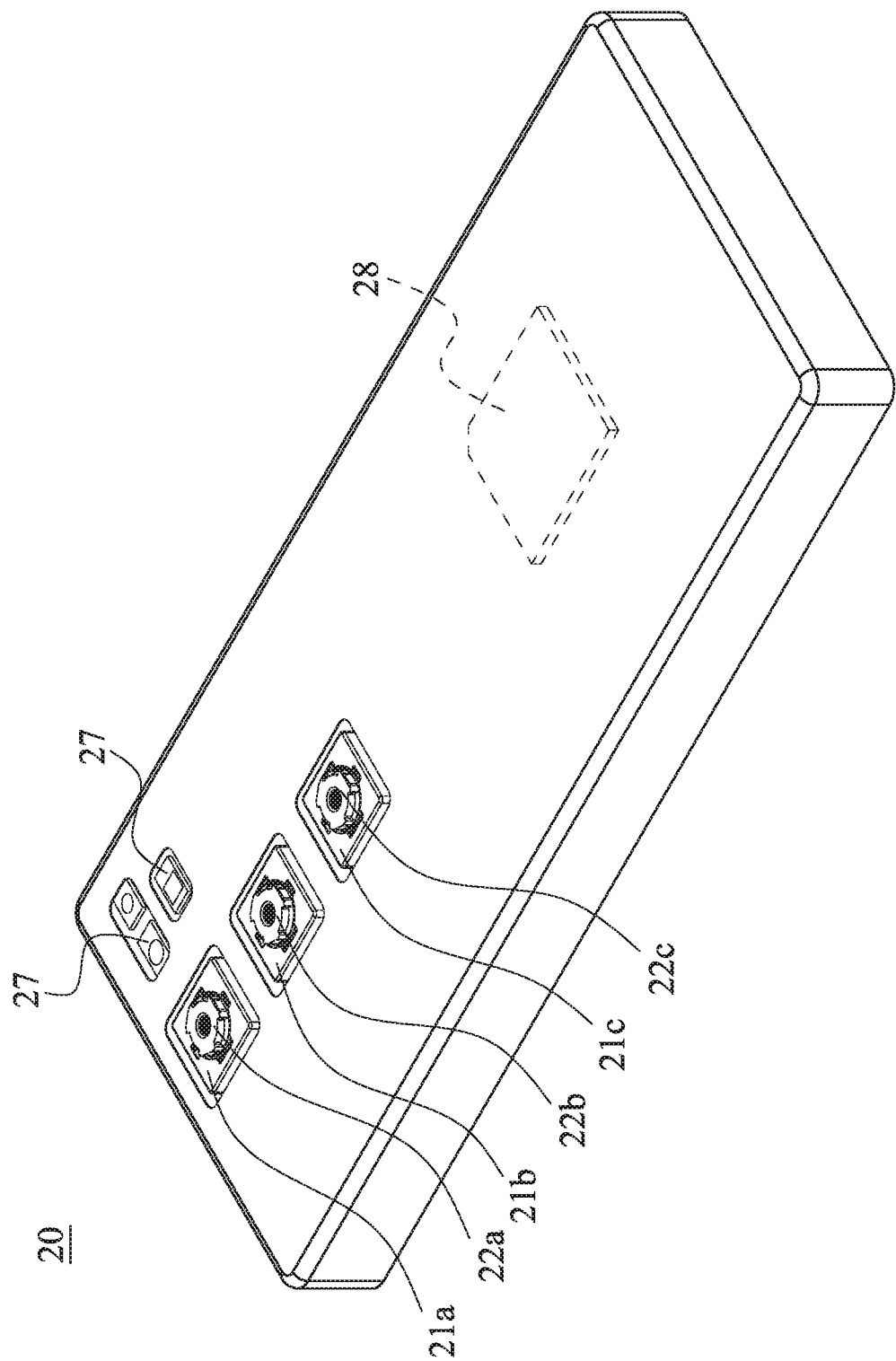
FIG. 25 is a schematic view of an electronic device according to the 6th embodiment of the present disclosure.

FIG. 25 is a schematic view of an electronic device 20 according to the 6th embodiment of the present disclosure. As shown in FIG. 25, the electronic device 20 of the 6th embodiment is a smart phone, wherein the electronic device 20 includes a photographing system 21a, a photographing system 21b and a photographing system 21c. The photographing system 21a includes an autofocus module 22a and an image sensor (not shown), the image sensor is disposed on an image surface (not shown) of the imaging lens assembly (its reference numeral is omitted) of the autofocus module 22a for receiving an imaging light from the imaging lens assembly. The photographing system 21b includes an autofocus module 22b and an image sensor (not shown), the image sensor is disposed on an image surface (not shown) of the imaging lens assembly (its reference numeral is omitted) of the autofocus module 22b for receiving an imaging light from the imaging lens assembly. The photographing system 21c includes an autofocus module 22c and an image sensor (not shown), the image sensor is disposed on an image surface (not shown) of the imaging lens assembly (its reference numeral is omitted) of the autofocus module 22c for receiving an imaging light from the imaging lens assembly.

Moreover, at least one of the autofocus module 22a, the autofocus module 22b and the autofocus module 22c is the autofocus module according to the present disclosure, and the optical properties of the imaging lens assemblies of the autofocus module 22a, the autofocus module 22b and the autofocus module 22c can be different. During the capturing process of the electronic device 20, with the aid of an auxiliary optical component 27, three images can be obtained by the photographing system 21a, the photographing system 21b and the photographing system 21c, and the desirable effects, such as a zoom effect and an exquisite effect, can be provided by the processing element (such as the imaging signal processor 28) of the electronic device 20.

The auxiliary optical component 27 can be the same as the auxiliary optical component 17 of the 5th embodiment, and which will not be described herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A plastic barrel, comprising:
an inner portion defining an interior space, wherein the inner portion comprises, in order from an object side to an image side, an object-side opening, a plurality of inner annular surfaces and an image-side opening, the interior space is configured for accommodating an imaging lens assembly, and the imaging lens assembly includes a plurality of plastic lens elements; and
an outer portion surrounding the inner portion, wherein the outer portion comprises a mounting structure, the mounting structure is disposed on a surface of the outer portion, the mounting structure is injection molded for mounting a planar conductive element and a wiring element, the mounting structure comprises at least three gate traces, and the at least three gate traces are located on a surface of the mounting structure;
wherein the plastic barrel is manufactured by injection molding, and the plastic barrel is a black single piece plastic body which is integrally formed; and
wherein a diameter of the object-side opening is $\phi o$, a diameter of the image-side opening is $\phi i$, and the following condition is satisfied:

$$0.05 < \phi o/\phi i < 0.80.$$

2. The plastic barrel of claim 1, wherein the diameter of the object-side opening is $\phi o$, the diameter of the image-side opening is $\phi i$, and the following condition is satisfied:

$$0.10 < \phi o/\phi i < 0.60.$$

3. The plastic barrel of claim 1, wherein the mounting structure further comprises an annular groove structure, the annular groove structure is disposed on the surface of the outer portion, and the annular groove structure is injection molded for mounting the wiring element.

4. The plastic barrel of claim 3, wherein the mounting structure further comprises a fixing structure, the fixing structure is adjacent to the annular groove structure, and the fixing structure is injection molded for mounting the planar conductive element.

5. The plastic barrel of claim 4, wherein the plastic barrel is a threadless structure.

6. The plastic barrel of claim 3, wherein the annular groove structure comprises an object-side side wall and an image-side side wall, the object-side side wall is disposed around the surface of the outer portion, the image-side side wall is corresponding to the object-side side wall, and the object-side side wall comprises at least three notches.

7. The plastic barrel of claim 3, wherein a diameter of a bottom of the annular groove structure is $\phi b$, the diameter of the image-side opening is $\phi i$, and the following condition is satisfied:

$$\phi b > \phi i.$$

8. The plastic barrel of claim 1, wherein twice a shortest distance between one of the gate traces and a central axis of the plastic barrel is $\phi g$, the diameter of the image-side opening is $\phi i$, and the following condition is satisfied:

$$0.80<\phi g/\phi i<1.40.$$

9. The plastic barrel of claim 1, wherein twice a shortest distance between one of the gate traces and a central axis of the plastic barrel is $\phi g$, the diameter of the image-side opening is $\phi i$, and the following condition is satisfied:

$$1.0<\phi g/\phi i<1.35.$$

10. The plastic barrel of claim 1, wherein the black single piece plastic body is blended with a chemical fiber or a glass fiber.

11. An autofocus module, comprising:
the plastic barrel of claim 1; and
the imaging lens assembly disposed in the interior space of the plastic barrel.

12. An electronic device, comprising:
the autofocus module of claim 11; and
an image sensor disposed on an image surface of the imaging lens assembly.

13. A plastic barrel, comprising:
an inner portion defining an interior space, wherein the inner portion comprises, in order from an object side to an image side, an object-side opening, a plurality of inner annular surfaces and an image-side opening, the interior space is configured for accommodating an imaging lens assembly, and the imaging lens assembly comprises a plurality of plastic lens elements; and
an outer portion surrounding the inner portion, wherein the outer portion comprises:
a mounting structure disposed on a surface of the outer portion, wherein the mounting structure is injection molded for mounting a planar conductive element and a wiring element, the mounting structure comprises an annular groove structure, the annular groove structure is disposed on the surface of the outer portion, and the annular groove structure is injection molded for mounting the wiring element; and
at least three gate traces, wherein the at least three gate traces are closer to the object-side opening than the annular groove structure to the object-side opening;

wherein the plastic barrel is manufactured by injection molding, and the plastic barrel is a black single piece plastic body which is integrally formed; and
wherein a diameter of the object-side opening is $\phi o$, a diameter of the image-side opening is $\phi i$, and the following condition is satisfied:

$$0.05<\phi o/\phi i<0.80.$$

14. The plastic barrel of claim 13, wherein the mounting structure further comprises a fixing structure, the fixing structure is adjacent to the annular groove structure, and the fixing structure is injection molded for mounting the planar conductive element.

15. The plastic barrel of claim 14, wherein the annular groove structure comprises an object-side side wall and an image-side side wall, the object-side side wall is disposed around the surface of the outer portion, the image-side side wall is corresponding to the object-side side wall, the fixing structure is adjacent to the image-side side wall, and the image-side side wall has an uneven thickness.

16. The plastic barrel of claim 13, wherein the plastic barrel is a threadless structure.

17. The plastic barrel of claim 13, wherein twice a shortest distance between one of the gate traces and a central axis of the plastic barrel is $\phi g$, the diameter of the image-side opening is $\phi i$, and the following condition is satisfied:

$$0.80<\phi g/\phi i<1.40.$$

18. The plastic barrel of claim 13, wherein the black single piece plastic body is blended with a chemical fiber or a glass fiber.

19. The plastic barrel of claim 13, wherein the annular groove structure comprises an object-side side wall and an image-side side wall, the object-side side wall is disposed around the surface of the outer portion, the image-side side wall is corresponding to the object-side side wall, and the object-side side wall comprises at least three notches.

20. The plastic barrel of claim 13, wherein a diameter of a bottom of the annular groove structure is $\phi b$, the diameter of the image-side opening is $\phi i$, and the following condition is satisfied:

$$\phi b>\phi i.$$

* * * * *